(12) United States Patent
Levine et al.

(10) Patent No.: US 7,487,106 B2
(45) Date of Patent: *Feb. 3, 2009

(54) SYSTEM AND METHOD FOR MANAGING MOBILE WORKERS

(75) Inventors: Kenneth M. Levine, Oviedo, FL (US); Garry Fenimore, Bradenton, FL (US)

(73) Assignee: Masterlink Corporation, Orlando, FL (US)

(*) Notice: Subject to any disclaimer, the term of this patent is extended or adjusted under 35 U.S.C. 154(b) by 3 days.

This patent is subject to a terminal disclaimer.

(21) Appl. No.: 11/845,968

(22) Filed: Aug. 28, 2007

(65) Prior Publication Data

US 2007/0299714 A1 Dec. 27, 2007

Related U.S. Application Data

(63) Continuation of application No. 09/656,393, filed on Sep. 6, 2000, now Pat. No. 7,283,971.

(51) Int. Cl.
G06Q 10/00 (2006.01)

(52) U.S. Cl. .................... 705/9; 705/7; 705/8

(58) Field of Classification Search ............ 705/9
See application file for complete search history.

(56) References Cited

U.S. PATENT DOCUMENTS

| | | | | |
|---|---|---|---|---|
| 5,189,606 A | 2/1993 | Burns et al. | ............ | 364/401 |
| 5,249,120 A | 9/1993 | Foley | ............ | 364/401 |
| 5,343,387 A | 8/1994 | Honma et al. | ............ | 364/401 |
| 5,369,570 A | 11/1994 | Parad | ............ | 364/401 |
| 5,408,663 A | 4/1995 | Miller | ............ | 395/650 |
| 5,873,124 A | 2/1999 | Draves | ............ | 711/202 |
| 5,913,201 A | 6/1999 | Kocur | ............ | 705/9 |
| 5,943,652 A | 8/1999 | Sisley et al. | ............ | 705/9 |
| 6,070,144 A | 5/2000 | Ginsberg et al. | ............ | 705/9 |
| 6,233,493 B1 | 5/2001 | Cherneff et al. | ............ | 700/95 |
| 6,278,978 B1 | 8/2001 | Andre et al. | ............ | 705/9 |

(Continued)

FOREIGN PATENT DOCUMENTS

EP 0 658 841 10/1994

(Continued)

OTHER PUBLICATIONS

Lesalnt, D. et al., "*Dynamic Workforce Scheduling for British Telecommunications PLC*," Interfaces, Institute of Management Sciences, vol. 30, No. 1, Jan.-Feb. 2000, pp. 45-56.

(Continued)

*Primary Examiner*—Andre Boyce
(74) *Attorney, Agent, or Firm*—Allen, Dyer, Doppelt, Milbrath & Gilchrist, P.A.

(57) ABSTRACT

A computer implemented system and method for managing mobile workers in an object oriented programming environment is disclosed. A plurality of target objects that correspond to facilities assets to be worked on by a mobile worker are classified within a database of the computer. The attributes of each target object are defined, including a task to be performed on each target object. Mobile workers are scheduled for the tasks to be performed on target objects by running a rule engine to determine the algorithms and heuristics to be used to schedule mobile workers for the tasks to be performed. The scheduled jobs are then output to the mobile workers.

20 Claims, 17 Drawing Sheets

U.S. PATENT DOCUMENTS

| | | |
|---|---|---|
| 6,484,036 B1 | 11/2002 | Sorkin et al. ................. 455/508 |
| 6,535,883 B1 | 3/2003 | Lee et al. .................... 707/100 |
| 6,571,215 B1 | 5/2003 | Mahapatro ..................... 705/8 |
| 6,578,005 B1 | 6/2003 | Lesaint et al. .................. 705/8 |
| 6,725,428 B1 | 4/2004 | Pareschi et al. ............. 715/530 |
| 2001/0047287 A1 | 11/2001 | Jacobs et al. ................... 705/9 |
| 2001/0049619 A1 | 12/2001 | Powell et al. ................... 705/9 |
| 2001/0051890 A1 | 12/2001 | Burgess ......................... 705/9 |
| 2002/0026342 A1 | 2/2002 | Lane et al. ..................... 705/8 |
| 2002/0065700 A1 | 5/2002 | Powell et al. ................... 705/9 |

FOREIGN PATENT DOCUMENTS

| | | |
|---|---|---|
| WO | 00/41104 | 7/2000 |

OTHER PUBLICATIONS

Smith, J. et al., "*Process Plan Generation for Sheet Metal Parts Using an Integrated Feature-Based Expert System Approach,*" Institute of Electrical Engineers, Database Accession No. 4175738, Abstract, 1 page.

SYSTEM AND METHOD FOR MANAGING MOBILE WORKERS

RELATED APPLICATION

This application is a continuation of Ser. No. 09/656,393 filed Sep. 6, 2000, now U.S. Pat. No. 7,283,971 issued Oct. 16, 2007, the disclosures of which are hereby incorporated by reference in their entirety.

BACKGROUND OF THE INVENTION

Computerized systems used in facilities management have become increasingly important in the management of mobile workers throughout large industrial and commercial facilities. The integration of work flow and mobile worker management in conjunction with the different jobs and tasks to be performed, and the availability of stores, such as inventory, is becoming increasingly complicated and important, as facilities managers desire to decrease costs, and workers are to be assigned jobs according to their skill level. There have been some proposals for managing various facilities and building projects, but they have not provided for a complete system and method for managing physical facilities in an efficient manner.

For example U.S. Pat. No. 5,343,387 to Honma et al. discloses a system for preparing a cyclic maintenance work schedule table, such as for a contractor having a contract with persons owning or managing buildings. In this system, data about workers and buildings to be maintained are entered in a computer system. A table of schedules is output for job assignments. Although the system provides for some maintenance work schedule, it does not provide for ongoing hourly, daily, monthly or other time frame for long range planning and scheduling, and is operable for day-to-day control over worker activities and management, including records management and log viewing.

U.S. Pat. No. 5,249,120 to Foley discloses an automated manufacturing cost link system with indirect cost allocation to identify material in an initial state for manufacturing and production at a final stage. U.S. Pat. No. 5,189,606 to Burns et al. discloses an integrated construction cost generator used to develop costs for construction products.

SUMMARY OF THE INVENTION

The present invention is advantageous and provides a computer implemented system and method for managing mobile workers in an object oriented programming environment. It is a client/server application for managing skilled and mobile workers. A server contains all information regarding work to be done, such as a machine or piece of equipment, who will perform the work, i.e., a person, and the rules, i.e., policies, governing the implementation and interactions.

Work is reduced to basic components: (1) targets, which are the objects of work, such as a piece of equipment; (2) tasks, which are the collection of actions to be taken, including attributes, such as skill required, estimated time, and material needed; (3) workers, which are the human resources capable of completing the desired task, including attributes of such as skill, skill level (grade), and schedule availability; (4) jobs, which are the collection of tasks supplied targets and assigned to workers.

The system uses artificial intelligence and automates supervision by using system agents to automate supervisory functions, including the work planning, scheduling, dispatching, stores management, and end-of-shift management. The software components are used as representations of the functions of individuals and behave based on rules and policies and are user configurable in a customized manner, such as through a graphical user interface. Facilities management can respond to changing conditions and maximize worker productivity with minimal human supervision.

In accordance with one aspect of the present invention, a computer implemented system and method manage mobile workers in an object oriented programming environment. A set of target objects are classified within a database of a computer corresponding to facilities assets to be worked on by a mobile worker. The attributes of each target object are defined, including the tasks to be performed on each target object. Mobile workers are scheduled for the tasks to be performed on target objects by running a rule engine to determine the algorithms and heuristics to be used to schedule mobile workers for the tasks to be performed. A schedule of jobs are output to the mobile workers.

The target objects can be classified within a server computer, which can contain the rule engine, and a schedule output to a client computer operated by the mobile worker. The mobile worker can be communicated with via a telecommunications link, such as a hand-held web based device. A plurality of user configured system agents are built within the system. The system agents can be used for automating work planning, scheduling tasks to workers, dispatching workers, stores management, job state management, or end-of-shift management. The rule engine can comprise a forward chaining rule engine or other rule engine with different rule sets for each system agent. Other rule engines as known to those skilled in the art can be used.

The algorithm used for scheduling mobile workers can include a brute force scheduling algorithm that is operable by determining an n number of jobs, and m workers trying all combinations of n jobs on the schedules for m workers, and choosing assignments that maximize a total utility of the worker's schedule. The algorithm can include a round robin scheduling algorithm that is operable by assigning jobs to mobile workers sequentially after ordering the unassigned job queue based on the utility of each unassigned job. The unassigned job queue can be ordered from a highest utility to a lowest utility or ordered from a lowest utility to a highest utility. The algorithm can include a rescheduling algorithm that is operable by determining the utility of unassigned jobs and rescheduling the assigned jobs with unassigned jobs on worker's schedules, based on an added utility.

A historical database can be maintained that reflects all changes in system agents and on user interactions. Job status and changes of task, system agents and schedules of jobs can also be viewed within a business viewer. The system also can maintain a system log of all activities.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
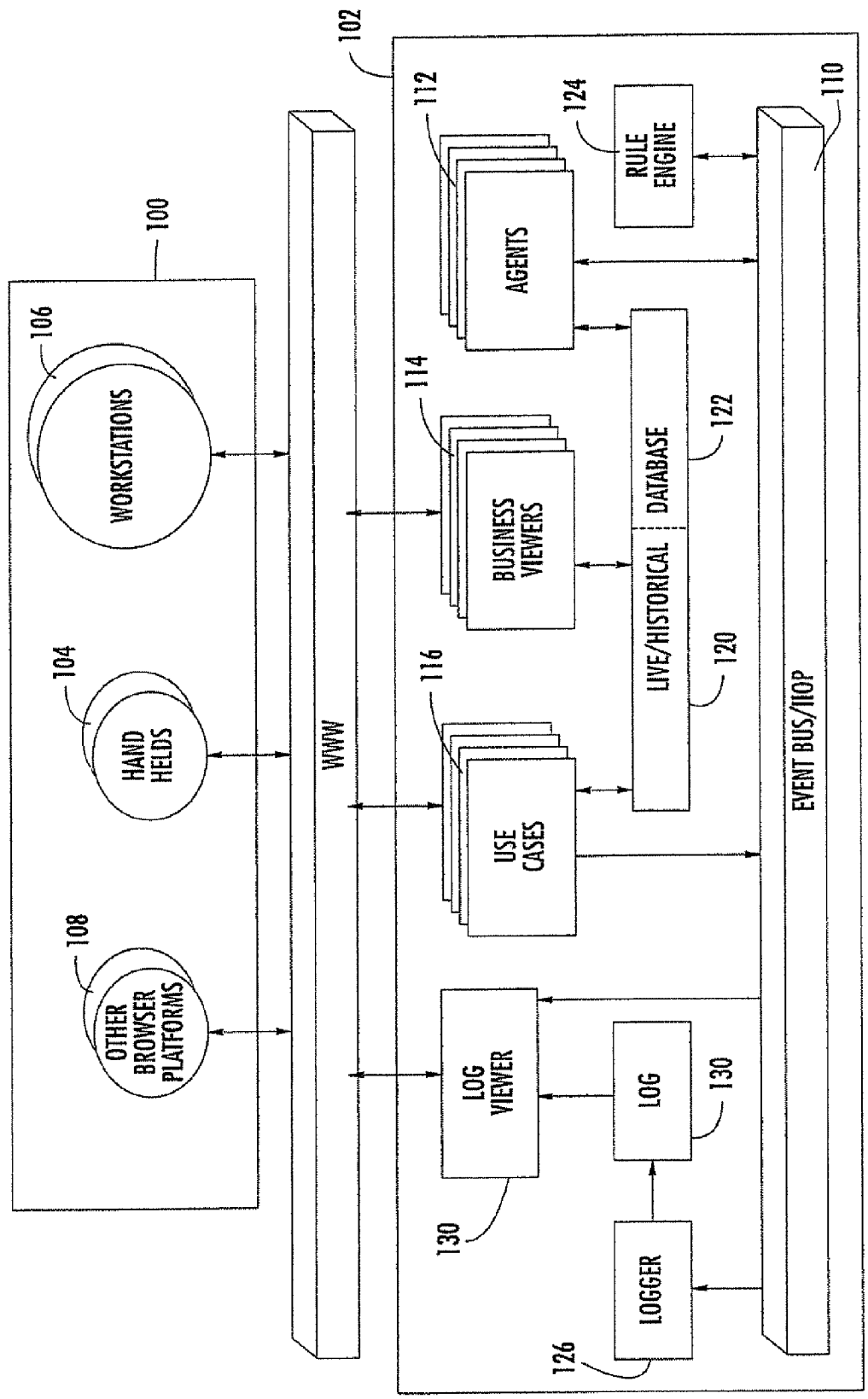
FIG. 1 illustrates a general overall block diagram of the system of the present invention showing the interconnection among the various components of the present invention.

For purposes of description, there follows an overview of the system of the present invention, giving a high level description of basic components and their interaction. The system of the present invention, in one aspect, is a web-based client/server application developed to manage the activities of skilled mobile workers (FIG. 1). The server contains all information regarding work to be done, who will perform the work, and the rules (policies) governing their implementation and interactions. The system can be used on a hand-held computer or PC workstation on a LAN. The system provides a remote worker with all relevant task information via a full or part-time telecommunications link, such as via a hand-held web based device.

For purposes of a non-limiting explanation of this system description, work is reduced into four major components:

1) Targets—Anything you aim to work on, e.g., a piece of equipment.

2) Tasks—The collection of actions to be taken, e.g., Task=Service Air-handler, Action=Lube Motor Bearing. Tasks have attributes such as skill required, estimated time, and material needed.

3) Workers—The human resources capable of completing the desired task. Workers have attributes such as skill, skill level (grade), schedule availability.

4) Jobs—Collections of tasks applied to targets and assigned to workers.

The different components of the system as described below can be defined and can operate on the principle of these four major relationships. The system architecture provides a consistent set of application interfaces that follow the natural process flows within each subsystem.

In accordance with one aspect of the present invention, there are some basic foundation components that are used to solve the common problems of a facilities management domain.

The system of the present invention is built on an implementation of a recognized numbering scheme. Many schemes can be used. AN example is the specification from the Construction Specifications Institute (CSI), which forms the foundation for architectural drawings. This foundation is composed of four components, which are described as follows:

1) Master Format Classification—Classifies what something is. For example: An Indoor Air-handler unit is part of the Mechanical System; is part of the Heating, Ventilating; and is part Air Conditioning Equipment Subsystem; is part of the Air Handling Units Subsystem Group; and is described as a Component called Indoor Air-handler. Thus, an Indoor Air-handler (or any piece of equipment) is classified for all facilities in the same manor. This completely removes any ambiguity relative to describing things that will be managed by the system.

2) Data Definition—Describes generically what attributes a classified object will have. It includes such things as Design Data (how it is expected to perform), Generic Manufacturing Data Form (make, model, etc.). For example: An Indoor Air-handler will have Design Data such as CFM, coil type/size, motor type/size, etc. This is also where external data requirements, such as OSHA requirements, are recorded. Additionally, this is where Tasks are defined. Tasks are a finite set of actions, based upon target classification. The system of the present invention provides a complete set of tasks for a given classification, and provides the facilities for any users to add more as desired. Data Definitions make up one component of Policy as described below.

3) Data Specification—This is where specific data about a particular Indoor Air-handler is recorded through the system interface. For example: Air-Handler #20 is in Building One, Floor 10, Room 1015. It is supposed to produce 10,000 CFM, has a 2 pass chilled water coil, it has a 15 horsepower motor, it has a GE Motor Model number 15 CCM, 230 volts, 3 phase. The data requirements have already been defined, so the user need only populate the "templates" provided. A user may add more data elements as desired.

4) Process Knowledge—The system of the present invention has embedded the process knowledge used in the basic supervisory functions for work management, including: Planning, Scheduling, Dispatching, Stores Management, Project Management, and Supervision (called Job State Management), and others. Process knowledge is the ability to make specific decisions relative to the function being managed. For example: When the Planner is deciding if a Task is due to be run, it must first determine the last time it was run and evaluate whether or not enough time has elapsed to make it eligible to be planned (used in a job). The system makes the link between the definition, the data, and the business logic needed to automate the decision making process.

Figure 17:
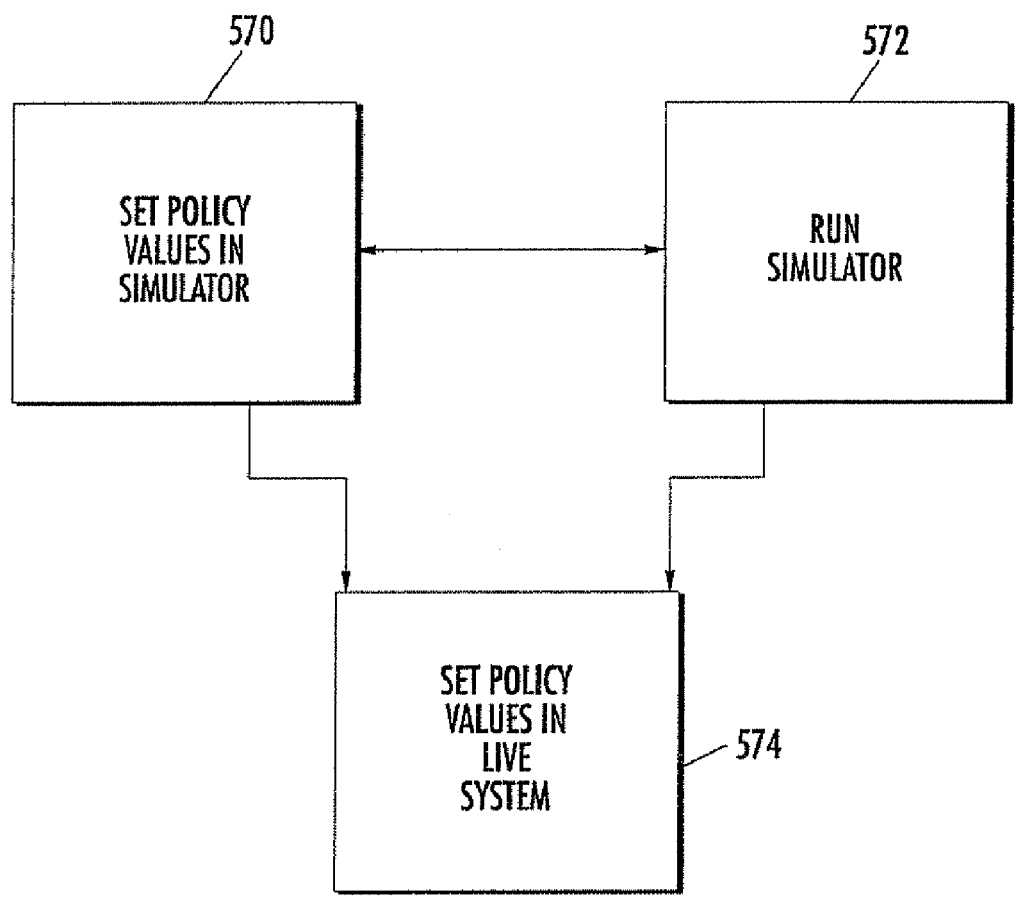
FIG. 17 is a block diagram illustrating the inter-relationship between the policy database, the simulator, and the system agents.

The present invention system product, built on the above foundational components, enables customers that use the invention to execute a continuous loop of operational improvements. This loop has three aspects to it: (1) Process;

(2) Policy; and (3) Prediction Through Simulation as shown in FIG. 17. Those three aspects can be explained as follows:

I. Process

The system defines process as the collective system activities that cover all aspects of worker management. It begins with a system-generated request for work (planning), and ends when a Job is completed. This involves, among other things, moving a Job (a collection of tasks for a target) through various states (points in its life-cycle) until it is completed. When a job has been created by the system it has a state called a Pending Job Order (PJO). The system evaluates all policies and, if policies are satisfied, moves the job in a job state transition to the next state, called Ready for Scheduling (RFS). For example, if a policy contained within a policy database on the server says that a job cannot be RFS unless the earliest start date is equal to or greater than today (the date of the evaluation), then the job is not moved to RFS. If that condition and all other conditions related to the STATE RPS are met, then the job is moved to RFS. That Process, and all others, are completely controlled by Policy contained in a policy database and implemented by system agents.

II. Policy

The system defines Policy as all of the definitions, rules, and business factors that control the behavior of the different system agents, which in turn, controls the managed workers. Examples of three types of policy elements include:

A. Definitions—If the tasks defined for a particular target are changed, then the mobile worker is affected. If the frequency for a task is changed from monthly to weekly, then the demand for labor resources is increased.

B. Rules—If the system is planning for tasks with a frequency of quarterly, then the system also plans for all frequencies less than that (monthly, weekly, etc.).

C. Business Factors—These elements directly affect how workers are scheduled, and how costs are accounted for. If a level five electrician is doing level three work, then the system tracks the "skill premium," i.e., the difference paid between the minimal skill required vs. the actual skill delivered. By adjusting the weight of this type of factor, users can minimize negative costs by weighting a given factor heavily. That will force the system to minimize skill premium occurrences.

III. Prediction Through Simulation

The system includes an intelligent work management simulator that provides management the capability to visualize the effect of proposed changes in business policy (work force usage, energy management, stores etc.) on business indicators, such as labor costs and energy savings. After policy values have been (temporarily) changed, planning and scheduling may be run and the results examined. Then, the work force's response to these scheduled tasks is estimated, based on their characteristics (workers, tasks, and their interdependencies). These results are then translated into business-meaningful knowledge that the manager can use to determine whether the proposed new policy values should be accepted, modified or rejected.

System Agents

The present invention uses a plurality of system agents to automate supervision, which includes work planning, scheduling, dispatching, stores management, job state management, and end-of-shift management. These system agents provide computer representations of functions normally fulfilled by people in an organization. The agents behavior is based on policy. This characteristic makes the agents totally configurable in user-customized ways. Management then has the ability to instantaneously respond to changing conditions, and maximize worker productivity with the assurance that policy decisions are implemented the same way each and every time.

A planner agent inventories all items requiring work, and determines the tasks to schedule, the skills required to complete the tasks, and material needed. For example, it looks at equipment records to determine which ones are due for service. The planner agent uses customer-established policy to decide if all criteria (such as time, cycles, etc.) have been met. When management's rules determine that the criteria were met, the agent creates a job.

A schedule agent matches skill resources with the demands of the job and creates a proposed schedule. The rules governing this agent concern the issues of location, skills, time needed, and similar requirements. Once this agent's evaluation is complete, the job is placed on a worker's schedule for further processing.

A dispatcher agent is responsible for tracking the location and status of the workforce. When orders are added to a resource's schedule, the dispatcher agent will determine, based upon priority rules, if the worker should be interrupted or be allowed to finish the current assignment. In addition, the dispatcher "knows" what methods to use to contact the worker. For example, if the worker's handheld computer does not respond to messages, the agent may then call the pager number.

A job state manager agent maintains the state of all active jobs. When system events occur, this agent evaluates rules determining which jobs, if any, should transition to a new state, and what the new state of each job is. For example, when the scheduler finishes running, scheduled jobs are typically transitioned out of Request For Scheduling (RFS) to one of the post-scheduling states, such as scheduled pending dispatch (SPD).

A stores agent is responsible for making sure the necessary materials required for a job are available. If the materials are not available, the store's agent will notify an operator that a purchase must be made in order to complete the job. The store's agent will continue to check for the availability of the material and, when it arrives, allow the job to be scheduled.

An end-of-shift agent evaluates all jobs that were placed on work schedules and not completed. For example, it will determine (among other factors), based on Policy, whether or not to give the job to another worker or reschedule the job to the same worker the next time that worker is on shift.

A project manager agent coordinates the flow of a project, which is defined as two or more jobs created for related purposes. For example: Project =Move Wall; Jobs include: 1) Disconnect Electric, 2) Remove Drywall & Studs, 3) Repair Flooring. Each may require a different skill, and may require sequential execution. In this example, the project manager agent will ensure that Job 1 is completed before Job 2 can be scheduled. This agent will facilitate management of sophisticated inter-job dependencies.

Other agents can also be included as necessary for system operation. Other policy agents can be used for performing tasks as required by those skilled in the art.

Business viewers are used as a portal into the system and allows users to follow a chronological flow in the system from the perspective of targets, workers jobs or agents. For example: To answer the question, "What did the Scheduler Agent do yesterday?", users will be able to select an Agent tab of a graphical user interface (GUI), the date, and "drill down" to find all the activities the agent performed and what the results were for that agent. In the case of the scheduler, a user could find out how many times the scheduler ran, how many jobs the scheduler evaluated, how many schedules were created, and how well those schedules can be rated for overall effectiveness (called utility).

All of the database changes made by the system Use Cases (user interactions with the system) and system Agents are reflected in a database system known as the intelligent work management history database. This data warehouse will be navigated by using business viewers. Users can view summary information about a whole class of targets (types based upon Master Format Classification), or information about individual targets (objects). These tools may also be used to produce historical reports for any date/time period. These tools are the primary means of viewing the historical performance of the workforce.

A user may navigate the web of business objects, going from class to class or object to object, following the natural business associations reflected in the data (e.g., a worker has a work schedule, the work schedule has jobs, each job has job tasks, each task is for a target). This can be referred to as the "space" the objects live in. The navigation tools (business viewers) also allow the user to move around in time and space, navigating the historical operation of the work force, producing reports focused on the space and time slice in which they are interested.

The present invention is especially advantageous because it allows simulation of facilities management by copying the live database for simulation. The simulator provides management the capability to visualize the effect of proposed changes in business policy (work force usage, energy management, stores etc.) on business indicators, such as labor costs and energy savings. After policy values have been (temporarily) changed, planning and scheduling may be run and the results examined. The work force's response to these scheduled tasks is estimated, based on their characteristics (workers, tasks, and their interdependencies). These results are translated into business-meaningful knowledge that the manager can use to determine whether the proposed new policy values should be accepted, modified or rejected.

Using the simulator does not change the value of any policy data in the "live" system. That is, the live system continues to run unaffected by any changes made in the simulation database. To effect this, the live data is copied into a simulation database when the simulator starts. Caching techniques are used to predefine the table headers, to make the simulation start up procedure timely.

The typical use of the simulator is to determine the effects of a policy change on the results of planning and scheduling. Although the pattern of use can vary, one pattern can operate as follows:

1. Set the values of one or two rules or factors (differential test of the value of that rule/factor(s)

2. Run the planning and scheduling agents. (This includes running the simulated worker schedules to completion for each shift.)

3. Use the business viewers to examine the differential impact of the new policy settings.

4. If the new settings are not acceptable return to step 1.

5. Persist the final policy settings to the live system (optional).

6. Exit the simulator.

Other uses would include:

a) Differential setting of a business object, such as an attribute of a task or a target definition and simulation of the direct effect of planning and scheduling with the new settings.

b) Adding a worker or a target and examining the effect of planning and scheduling with the new worker or target.

c) Major changes, such as adding a third shift of workers.

The Simulator can display a screen that is used to control the simulation process. The actual inspection of results is explained in the following section, "viewing simulations". The simulation use case presents one screen with a number of choices for the user. The user is prompted to name the simulation and provide a description of its raison d'être, and is provided with the following capabilities:

1. Simulate X days agent processes. This includes the following:

a) Run the Planner. The planner is run in the simulated world, followed by the job state manager.

b) Run the scheduler and the scheduled jobs. For each shift during the planning horizon.

c) Jobs are scheduled.

d) The job state manager is run to transition the job state.

e) Dispatchable jobs are "run". The worker simulation agent determines the disposition of each scheduled job.

f) The project manager is run to prepare the jobs that are now eligible to be run.

g) The end of shift agent is run to determine the fate of any unfinished jobs (if any).

h) The start of shift agent is run to prepare the initial work schedules for the next shift.

2. Reinitialize. Rolls back the registry and all jobs to their initial state (that is, as they were at the beginning of the simulation).

The following steps three (3) and four (4) are not necessary steps, but could be followed.

3. Roll back planned and scheduled work. All jobs created by the planner are removed. All jobs that existed at the beginning of the simulation are returned to their initial state. Similar to "reinitialize" except all changes to the registry are preserved.

4. Persist the registry. Normally, all changes made in the simulation are invisible in other simulations or the "real world". This command allows the user to propagate all registry changes from the simulated world to the real world.

5. End the simulation. The simulation will be captured as a cluster of database records, for post-simulation viewing with the Business Viewers.

The Business Viewers of the present invention are the main tool used to view the results of the simulations. The Business Viewers do not distinguish between the live system and simulated worlds. Instead, the run on the appropriate database and report results accordingly. A user may open N windows, each of which may point at a time and location in any world. This allows users to view one or more time points in a given simulation, compare two simulations or a simulation and the real world, and so forth.

Future plug-ins into the log viewer will allow a context-based comparison of results. The delta in the registries for two worlds will be displayed along side the comparison of values in corresponding log nodes for the two worlds.

Referring now to FIG. 1 there is illustrated an overview of the architecture of the present invention and showing a facility at block 100 with various types of user operating stations that interconnect to the server 102 via a telecommunications link, such as the worldwide web of the internet. The mobile operators use hand-hand mobile devices 104, workstations 106 and other browser platforms 108, which interconnect such as by a telecommunications link, with the server 102 and its various components, which communicate via an event bus 110. The basic components of the system include a plurality of system agents 112 as described above, business viewers 114 that are coupled with one business viewer application and a plurality of Use Cases 116 that define user interaction with the computer. The system agents 112, business viewers 114 and Use Cases 116 are interoperative with live and historical databases 120, 122. The system agents and Use Cases also interact with the event bus, which also interacts with a rule engine 124 that is stored as a program within the server. The event bus also interacts with a logger 126 and log viewer 128, which both interact with the log database 130.

Figure 2:
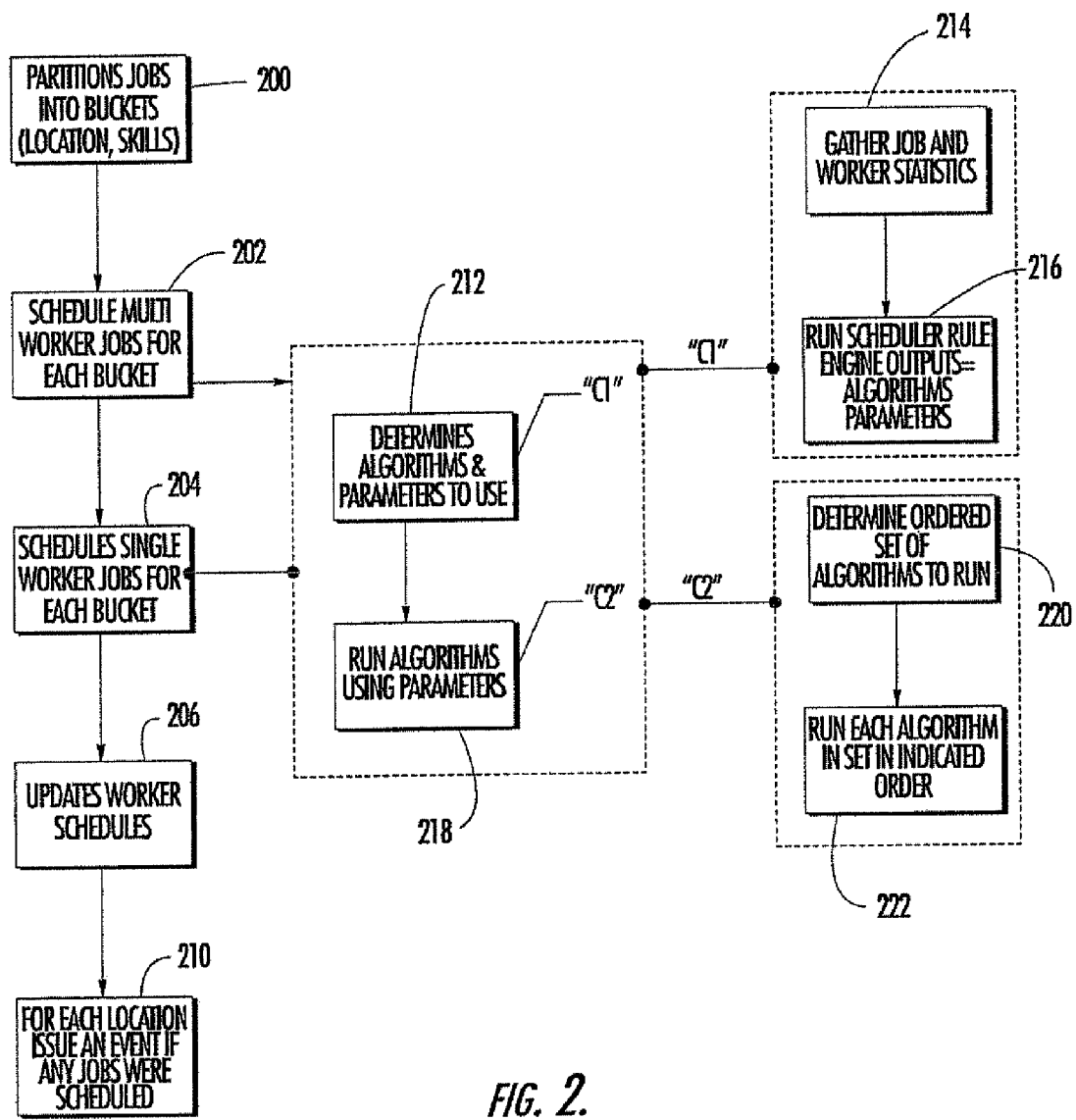
FIG. 2 is a flow chart illustrating the scheduling agent of the present invention.

FIG. 2 illustrates the basic flow chart of the scheduler system agent. As identified, at block 200, jobs are petitioned into buckets based on such attributes as the job's location and skill requirements. Multi-worker jobs are scheduled for each bucket (block 202) and single worker jobs are scheduled for each bucket (block 204). Worker schedules are updated (block 206) and for each location, an event is issued if any jobs were scheduled (block 210).

The algorithms and parameters to use are determined when the multi-workers and single workers are scheduled (block 212). At this point, it is possible to gather job and worker statistics (block 214), and then run a scheduler rule engine that outputs the algorithm and parameters to be used to schedule that set of jobs to those workers (block 216). After the algorithms are determined, the algorithms are run using the output parameters (block 218). An ordered set of algorithms to run are determined (block 220), and for each algorithm to be run, it is set in the indicated order (block 222).

Figure 3:
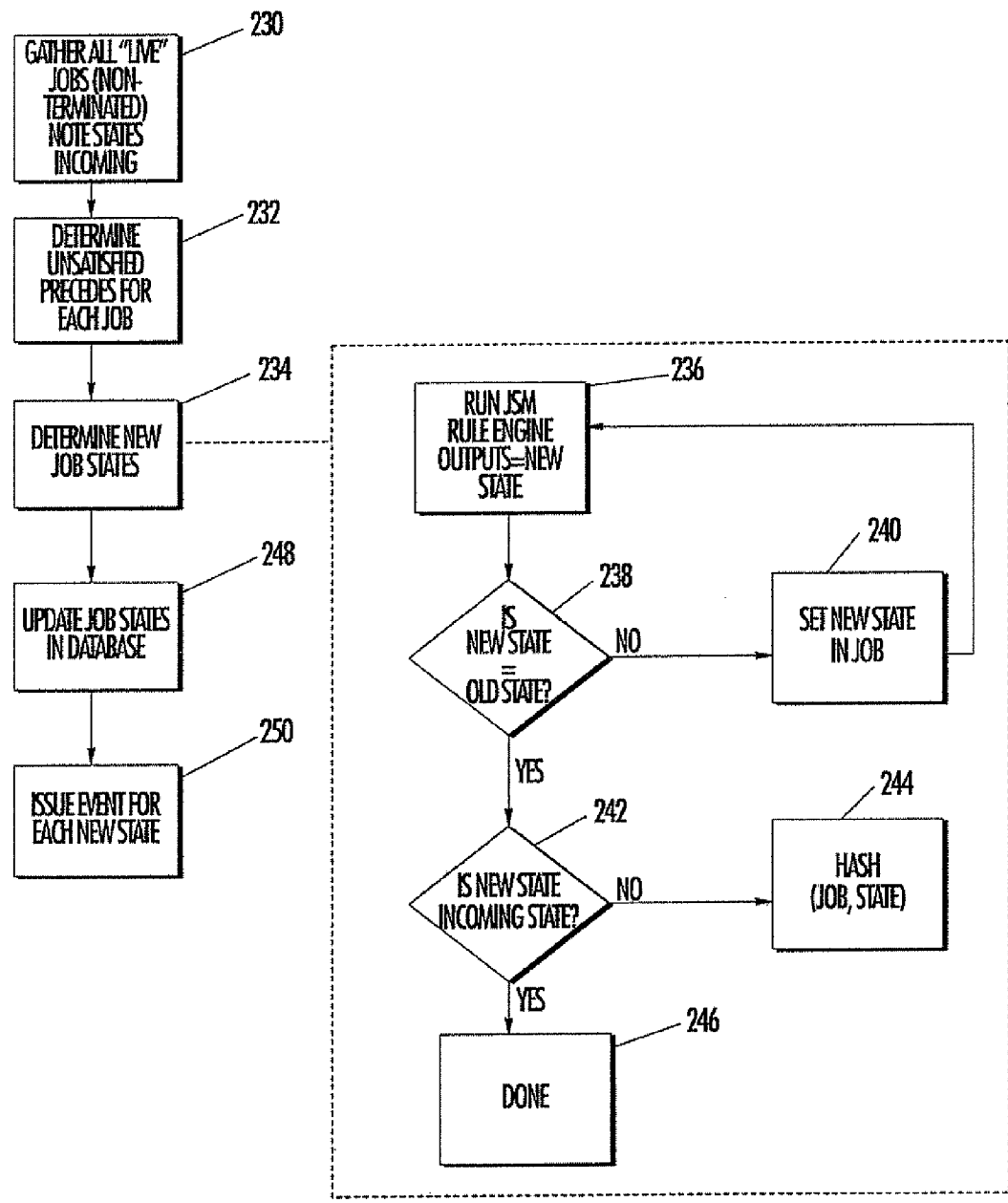
FIG. 3 is a flow chart illustrating the job state manager agent used for controlling other system agents in the present invention.

FIG. 3 illustrates a job state manager agent. As illustrated, the job state manager will gather all "live" jobs (non-terminated) where the different states that are incoming are noted at (block 230). The unsatisfied procedures are determined for each job (block 232). New job states are determined (block 234). At this time, the job state manager rule engine is run and the outputs equal the new states (block 236). A determination is then made whether a new state equals the old state (block 238). If it is not, then the new state is set in the job (block 240), and the rule engine runs again. If the new state equals the old state, then a determination is made whether a new state is the incoming state (block 242). If it is not, then a HASH function for the job and state is run (block 244). If the new state is the incoming state, then the system is done (block 246), and the job states are updated in the database (block 248). An event is issued for each new state (block 250).

Figure 4:
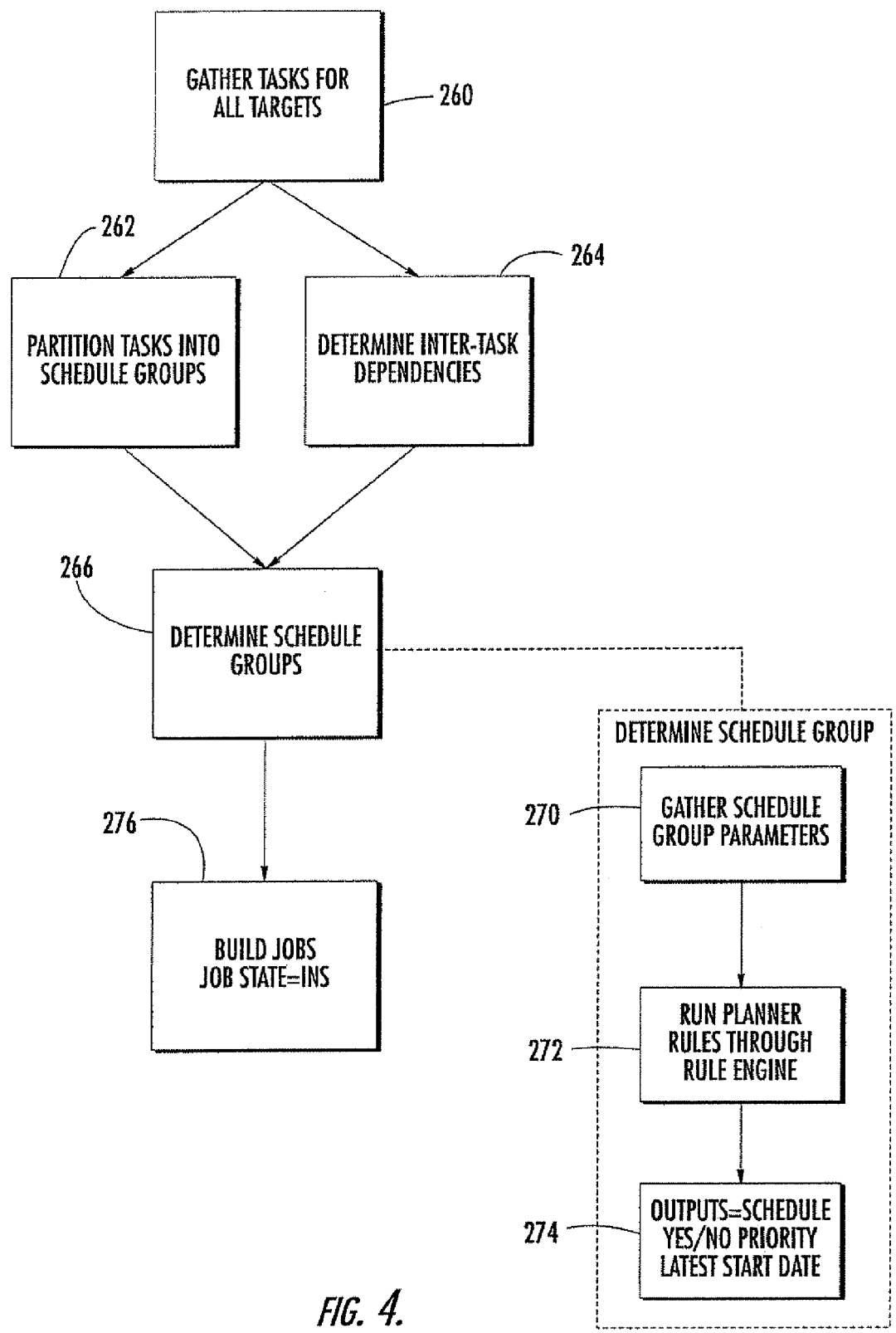
FIG. 4 is a flow chart illustrating the planner agent of the present invention.

The planner agent is illustrated in FIG. 4. Tasks are gathered for all targets (block 260). The tasks are petitioned into schedule groups (block 262) and the intertask dependencies are determined (block 264). The schedule groups are determined (block 266) and a subroutine run to determine the schedule group (block 268). In the subroutine, the schedule of group parameters are gathered (block 270), and the planner rules are run through the rule engine (block 272). Outputs of the rule engine include, for example, the job's priority and the job's earliest and latest start dates (block 274). Jobs are built and assigned an initial state (block 276).

Figure 5:
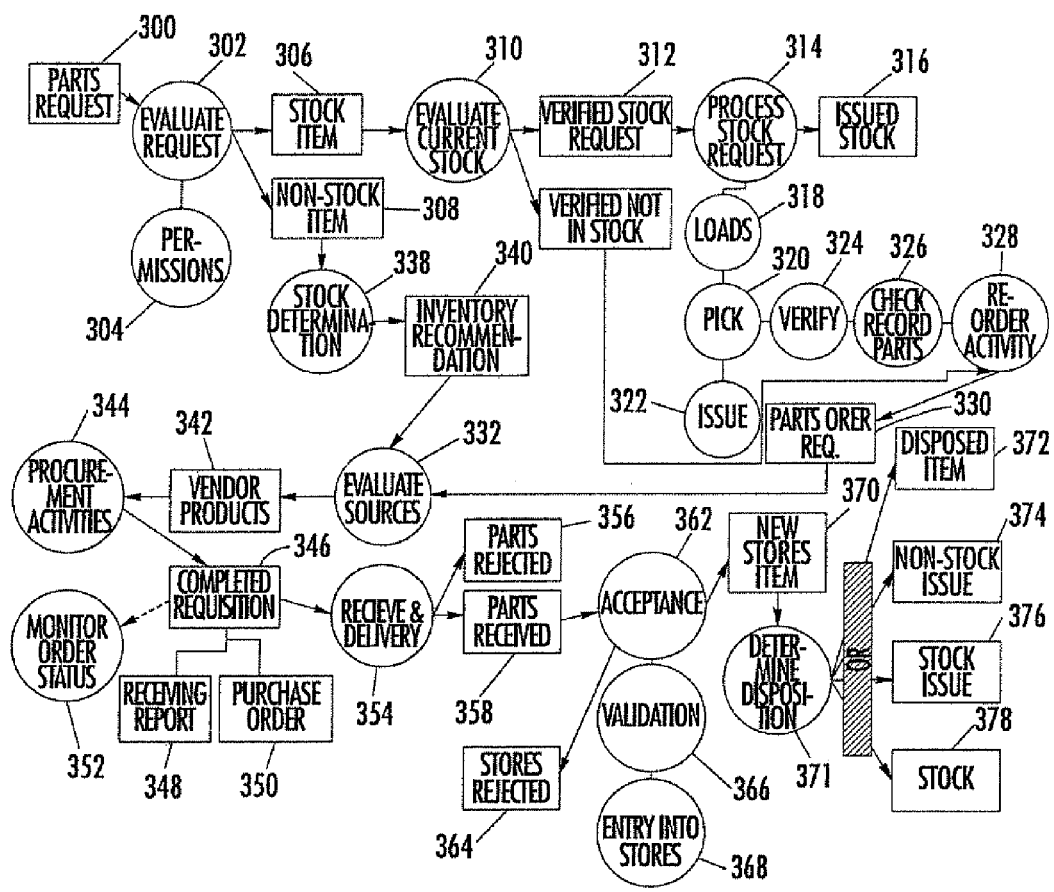
FIG. 5 is a flow chart illustrating the storage agent of the present invention.

A storage agent is shown in FIG. 5 and illustrates the process flow for determining inventory and the stores. A parts request is first made (block 300) and a request evaluated (block 302). Permissions are determined (block 304). A determination is then made whether it is a stock item (block 306) or a non-stock item (block 308). The current stock is evaluated if it is a stock item (block 310). At this time, if the current stock has been evaluated, the system determines if there is a verified stock request (block 312). If there is, a process stock request is run (block 314) and stock issued (block 316). The system follows a series of steps for loading (block 318), picking and issuing (blocks 320 and 322), and verifying and checking the records and reordering activity (blocks 324, 326, and 328). This also occurs if after the current stock is evaluated, there is not any stock. After the reorder activity, a parts order is requested (block 330) and the sources are evaluated (block 332). This occurs at the evaluate request, when a non-stock item is determined and the stock determination is made with an inventory recommendation (blocks 338 and 340). After sources are evaluated, vendor products are determined (block 342) and procurement activities arranged (block 344). The completed requisition occurs (block 346) with a receiving report and purchase report (blocks 348 and 350). The order status can be monitored (block 352). At the time of a completed requisition, there is a receive and delivery (block 354) with parts rejected (block 356) and parts received (block 358). If parts are received, there is an acceptance (block 362), and possibly, a rejection (block 364), and if not, then a validation (block 366) with an entry into stores (block 368). If it is a new store item (block 370), then the disposition is determined (block 371) and there is a disposed item (block 372), non-stock issued (block 374), a stock issued (block 376), or stock (block 378).

The job state manager agent is the component that makes all state changes in all live jobs. Every job has a state. The job begins in an initial state, as shown in the Job State Transition diagram of FIG. 6. The job begins as an initial state (null state) and looks for proceeds with the waiting for proceeds block. The sequence of job starts is determined by the job state manager's rule set. The job state manager runs the rule engine to determine when to make a transition for different customers and can arrange the state with different orders and make transitions at different times. A typical sequence of job state transitions is as follows: the initial job for a job that has preceding jobs is "waiting for proceeds." This is generally followed by "waiting for stores" (WFS) as the next step, and then once stores are assigned, the job becomes a pending job order. These and other state transitions are shown in the job transition diagram of FIG. 6. This diagram shows the default flow of job states, but individual users can configure job state transitions based on user defined rules and policies.

Figure 7:
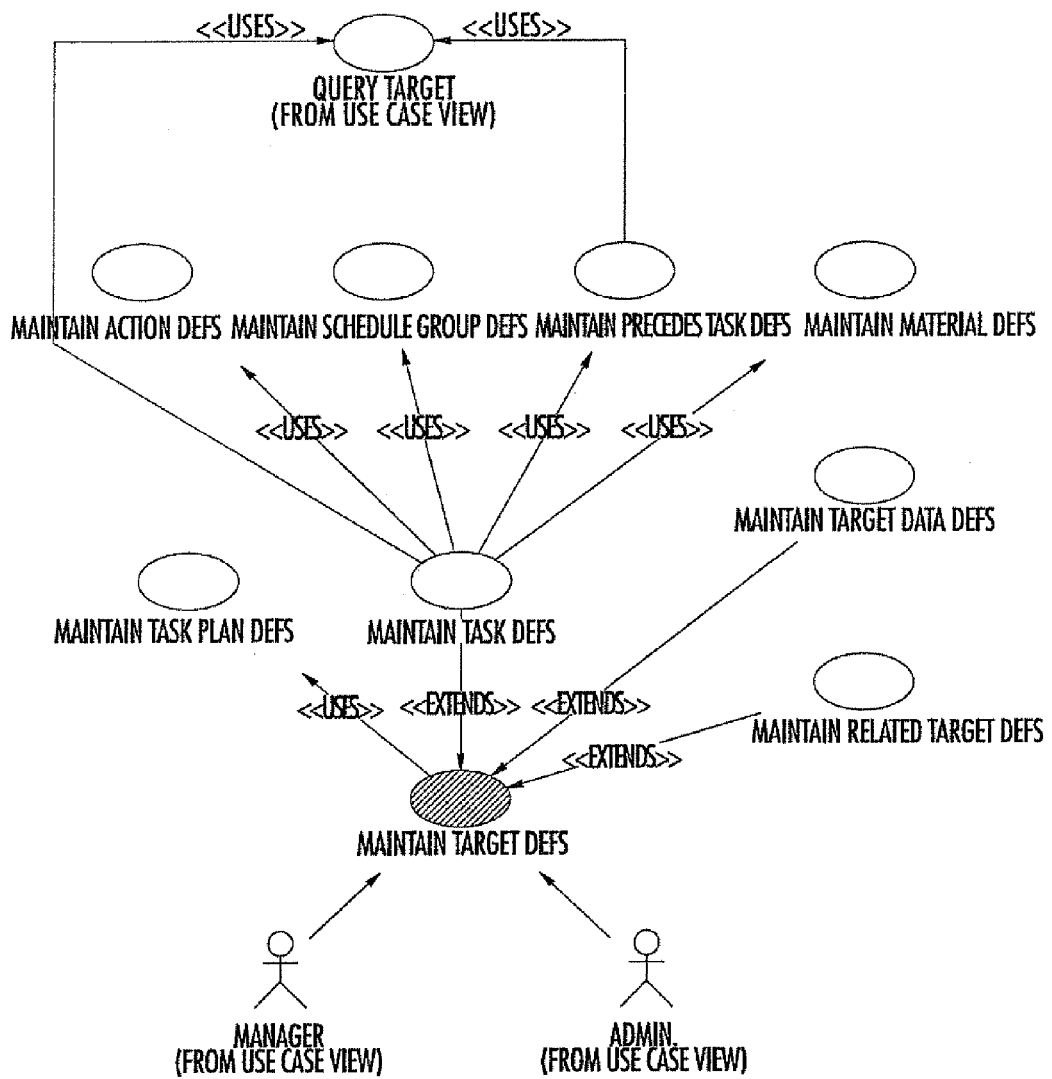
FIGS. 7-11 illustrate flow charts for Use Cases, which show the interaction among human components and the computer of the present invention.
Figure 8:
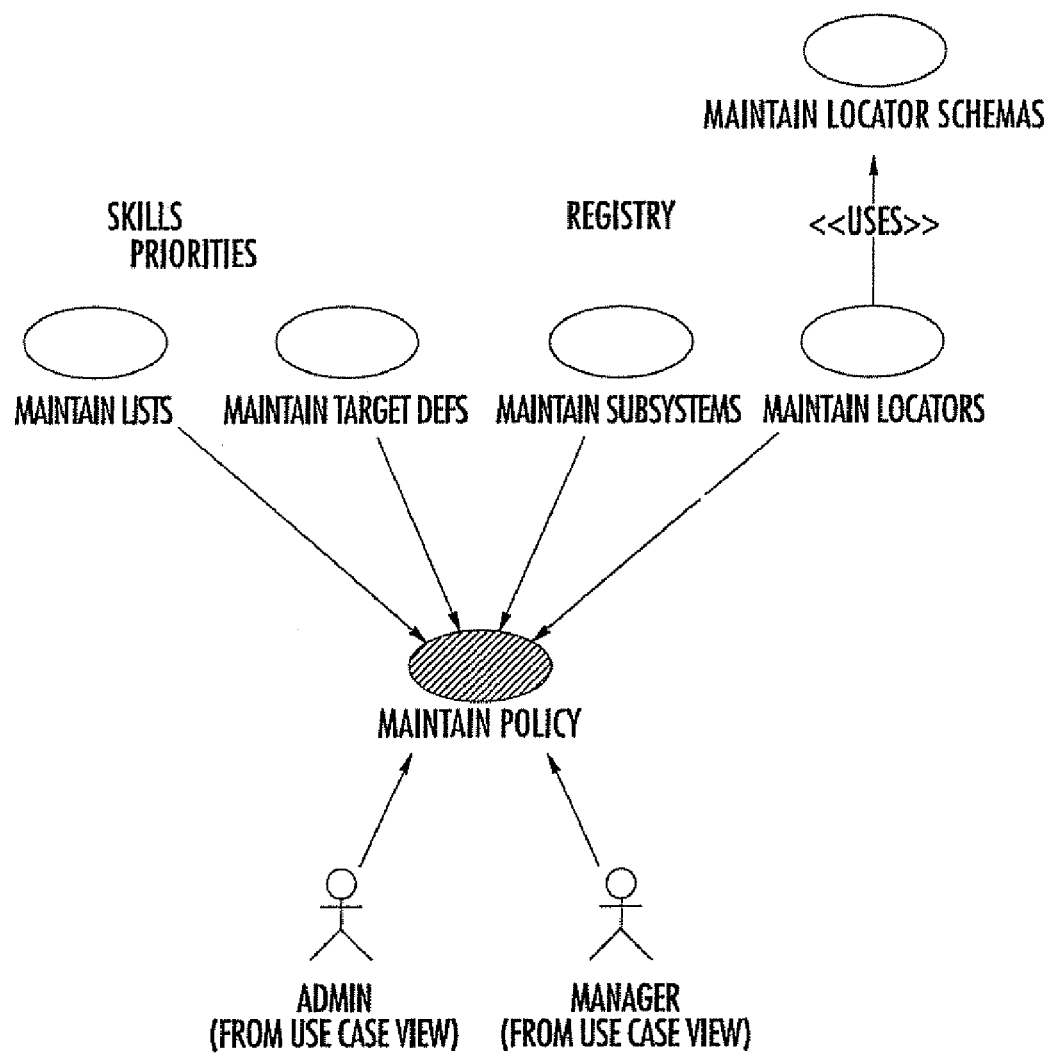
Figure 9:
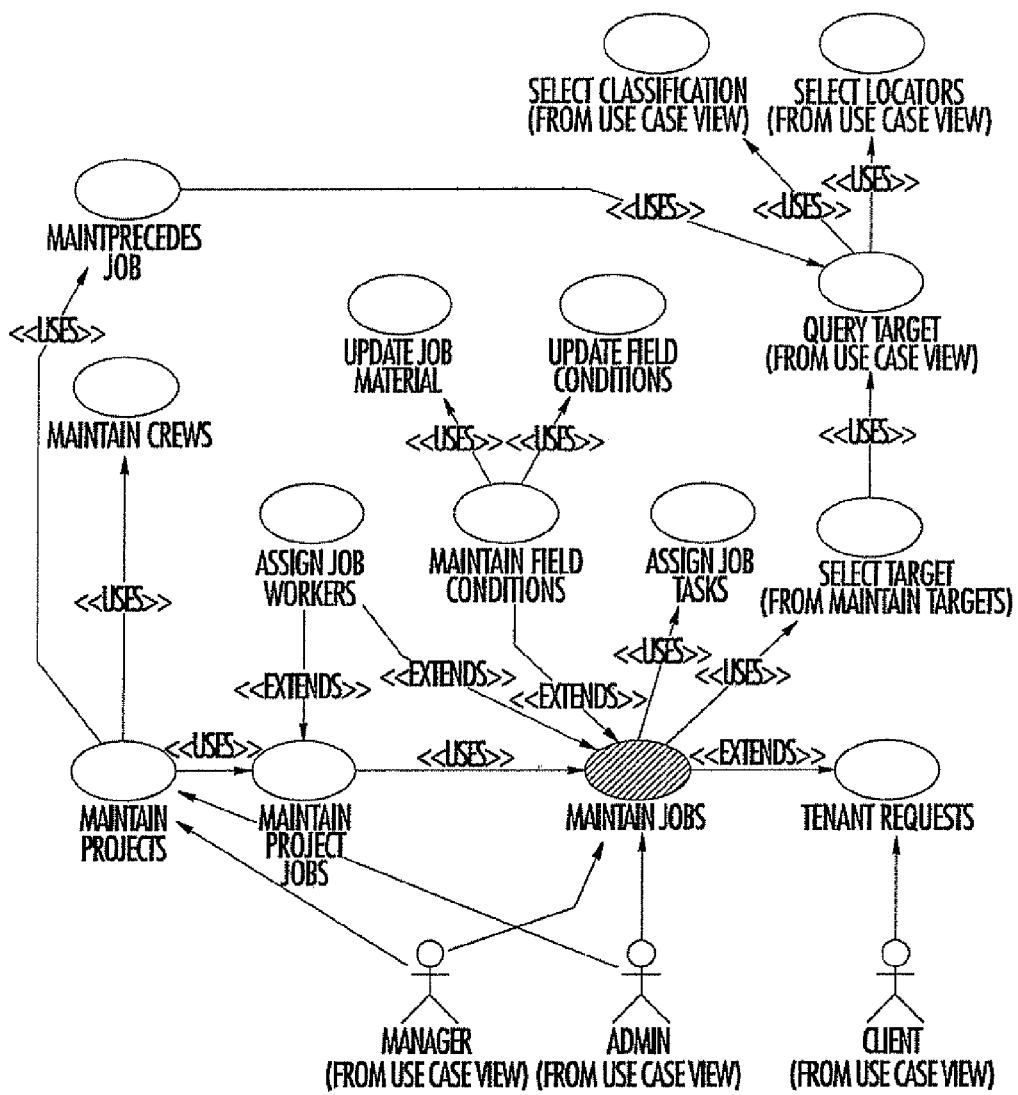
Figure 10:
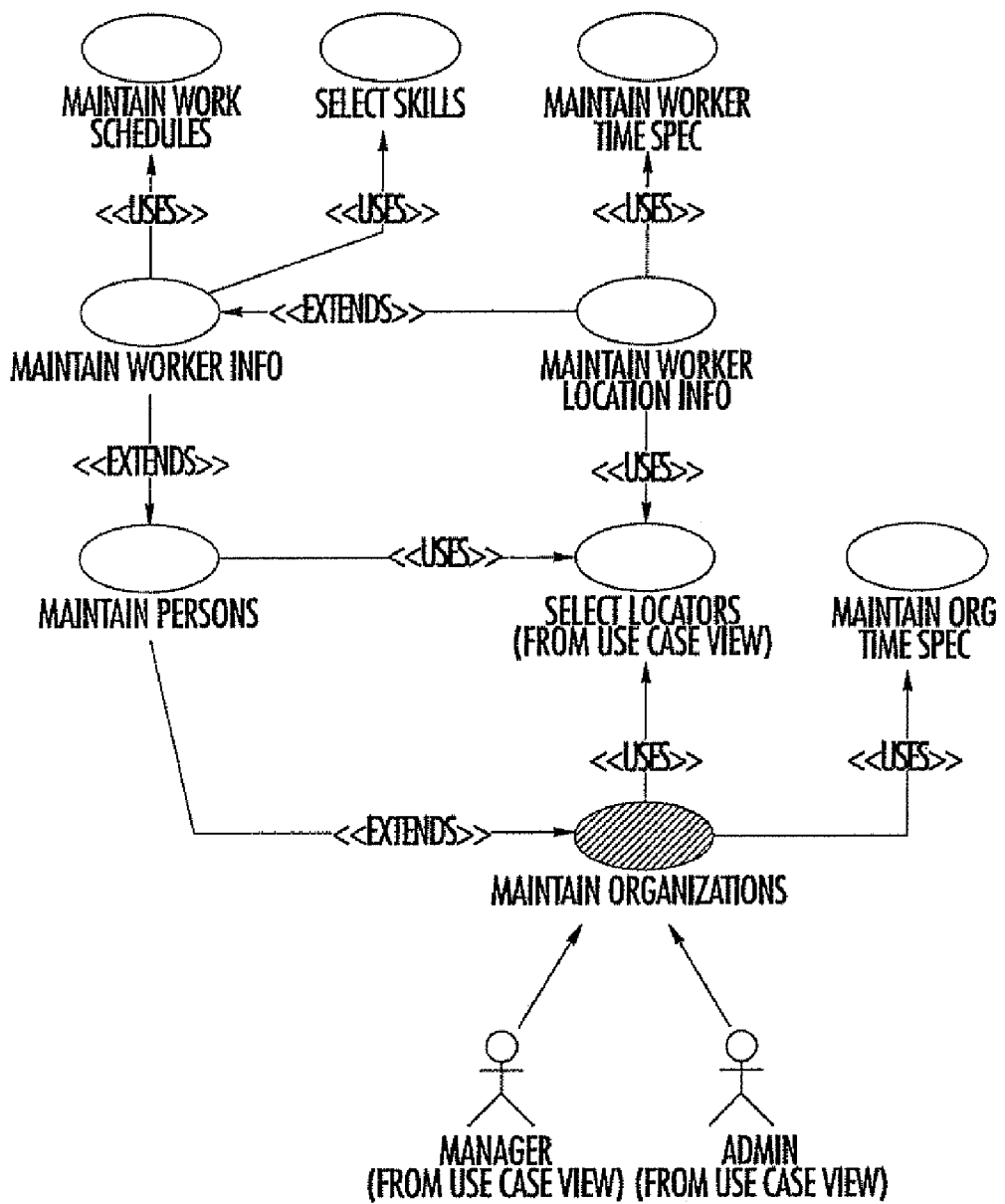
Figure 11:
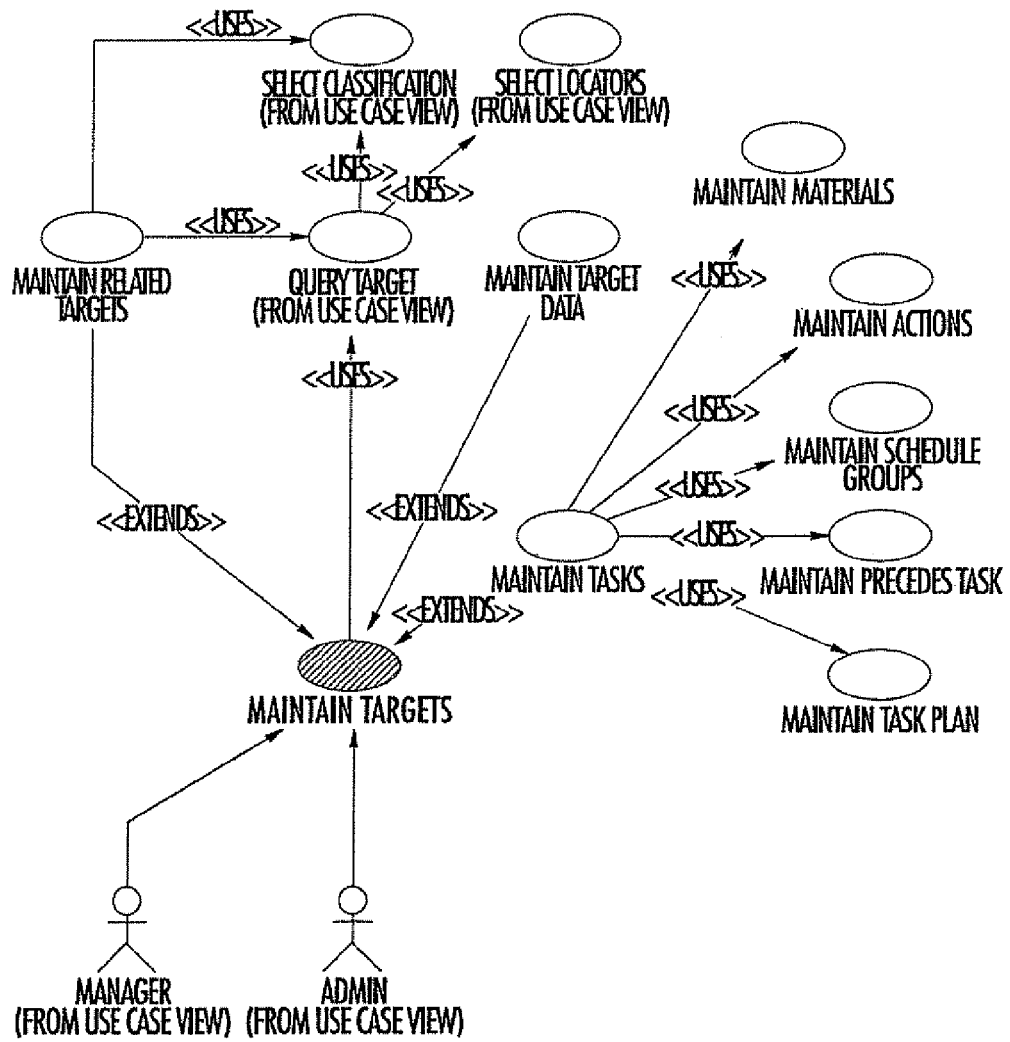

FIGS. 7-11 show various Use Cases where task definitions can be maintained in FIG. 7, and in FIG. 8, the policy definition can be maintained. In FIG. 9, the target definitions are maintained and defined, and in FIG. 10, various worker location information is maintained. In FIG. 11, the targets are maintained. These flow charts show the interaction among computer and user and how definitions and other uses are maintained and selected. FIGS. 12-15 show flow charts for various algorithms.

Figure 12:
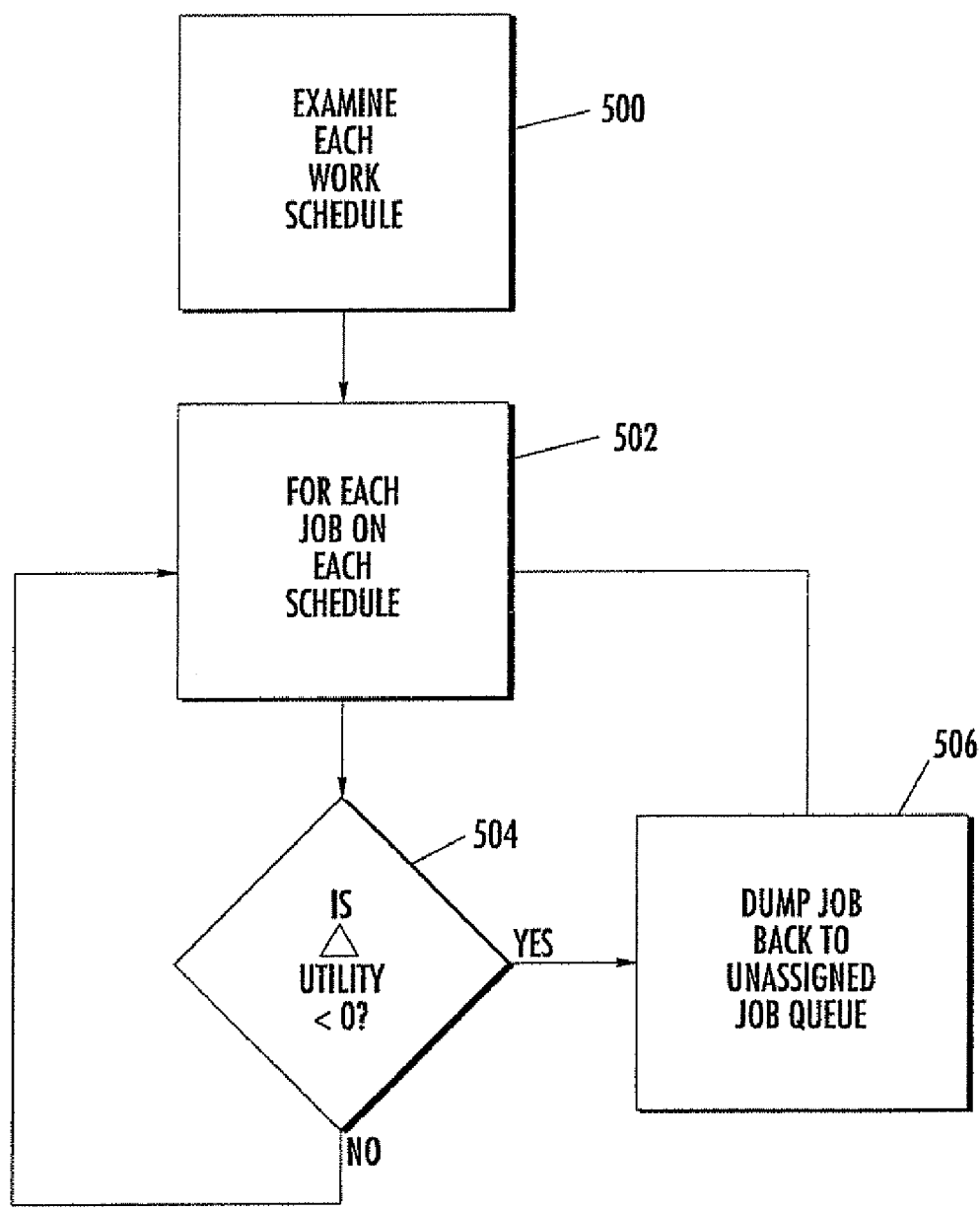
FIG. 12 is a flow chart illustrating a clean up scheduling algorithm of the present invention.

The clean up scheduling algorithm is set forth in FIG. 12 where each work schedule is examined (block 500). For each job on each schedule (block 502), a determination is made whether the changing utility is less than zero (block 504), and if yes, then the job is dumped back to the unscheduled job queue (block 506). If the changing utility is not less than zero, then the loop starts again.

Figure 13:
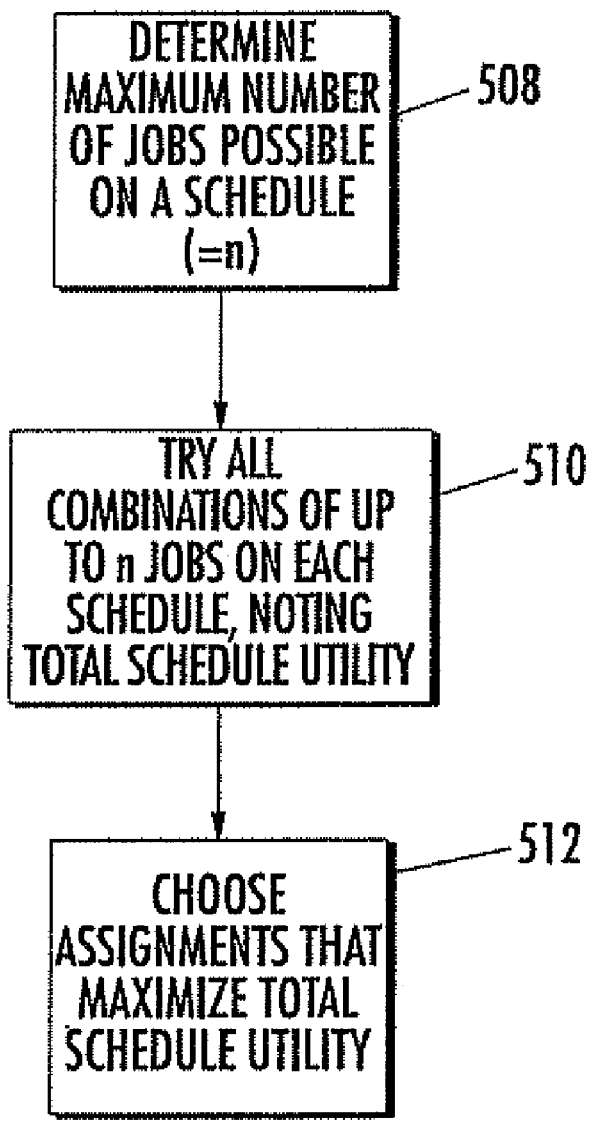
FIG. 13 is a flow chart illustrating a brute force scheduling algorithm of the present invention.

FIG. 13 shows the basic high level flow chart of the group used for the scheduling algorithm. The maximum number of jobs possible on a schedule equal to n is determined (block 508). All combinations of up to n jobs are tried on each schedule, noting the total scheduled utility (block 510). Assignments are chosen that maximize the total scheduled utility (block 512).

Figure 14:
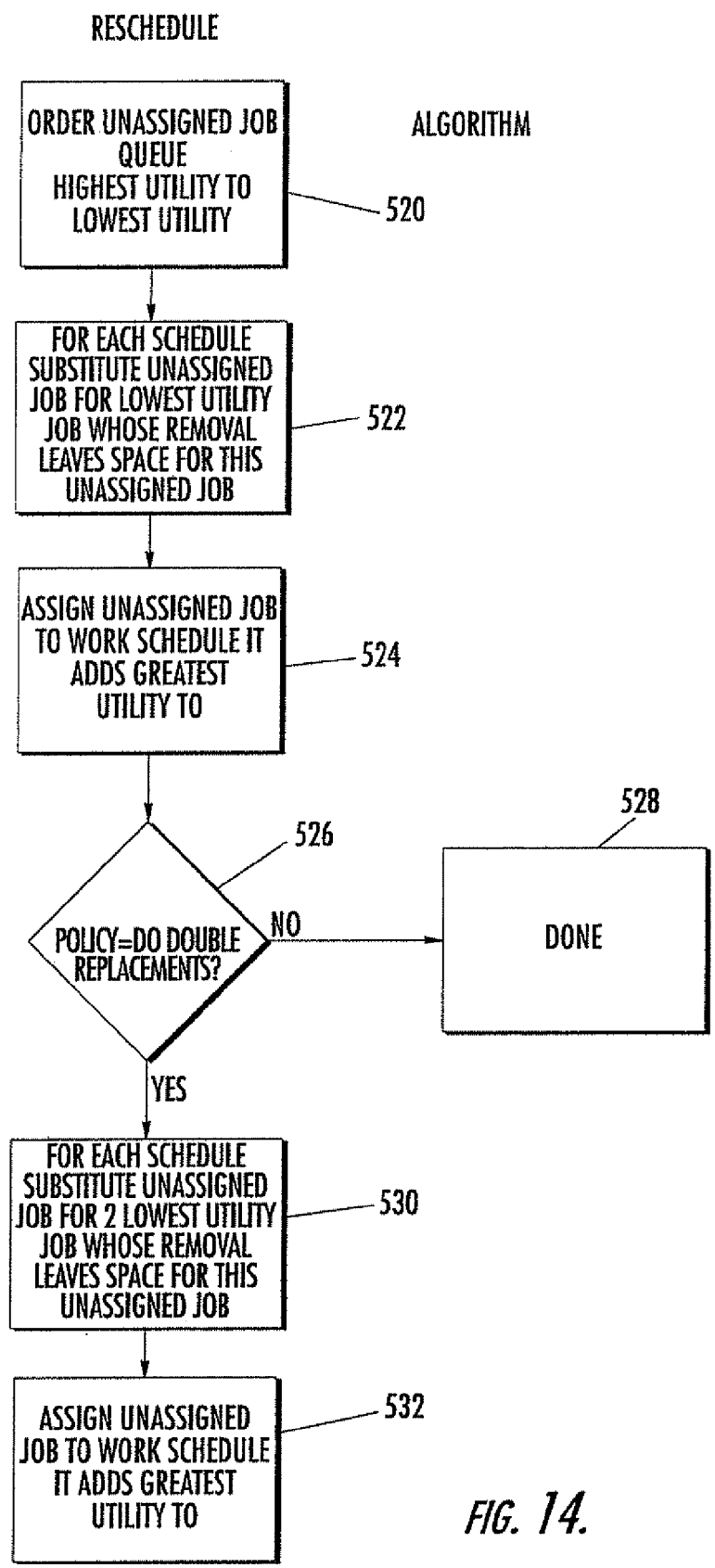
FIG. 14 is a flow chart illustrating a rescheduling algorithm of the present invention.

The basic concept of the rescheduling algorithm is shown in block format in FIG. 14. The unassigned job queue is ordered from the highest utility to the lowest utility (block 520). For each schedule, the system substitutes the unassigned job for the lowest utility job whose removal leaves space for the unassigned job (block 522). The unassigned job is assigned to the work schedule it adds the greatest utility (block 524). The system determines whether to do double replacements (block 526). If there are no double replacements, then the system is done (block 528). If double replacements are desired, then for each schedule, an unassigned job is substituted for two lowest utility jobs whose removal leaves space for the unassigned job (block 530). Unassigned jobs are assigned to the work schedule and adds the greatest utility (block 532).

Figure 15A:
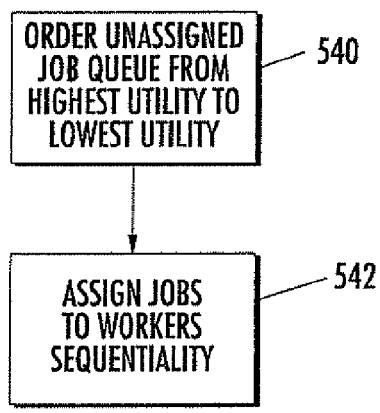
FIG. 15A illustrates a round robin scheduling algorithm of the present invention.
Figure 15B:
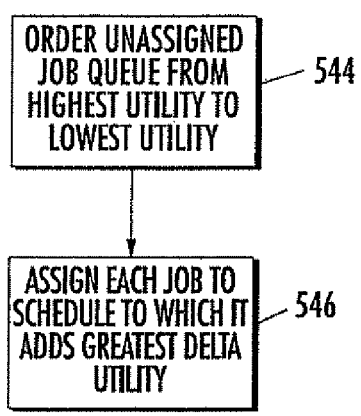
FIG. 15B illustrates a maximal utility scheduling algorithm based on ordering the unassigned job queue from highest to lowest utility.
Figure 15C:
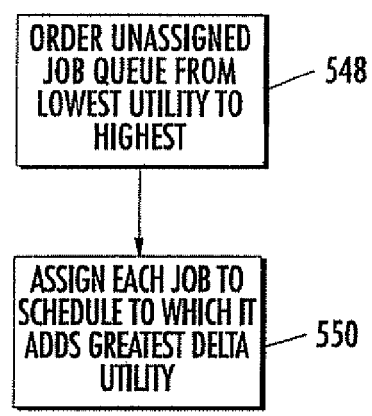
FIG. 15C illustrates a maximal utility scheduling algorithm based on ordering the unassigned queue from lowest to highest utility.
Figure 16:
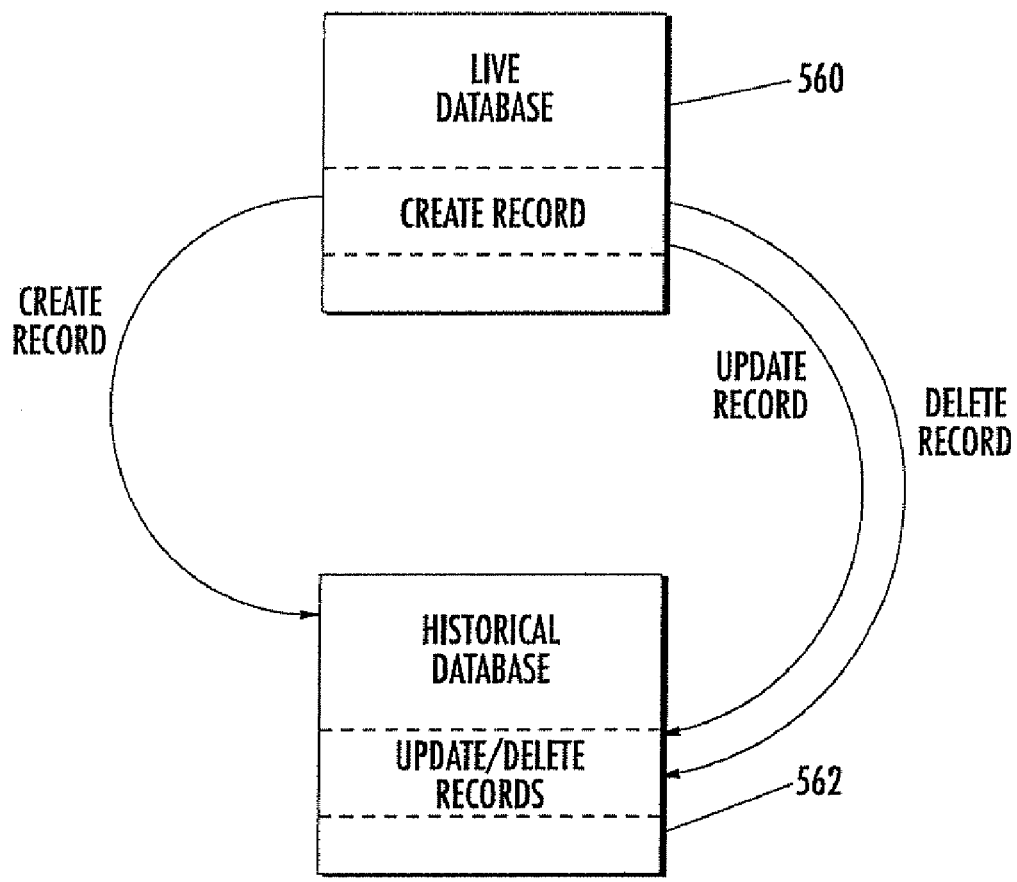
FIG. 16 illustrates the inter-relationship between the live and historical databases.

The primary robin scheduling algorithm is shown in FIGS. 15A-15C. As shown in FIG. 15A in the round robin scheduling algorithm, the unassigned job queue is ordered from the highest utility to the lowest utility (block 540) and then the jobs assigned to the workers sequentially (block 542). FIG. 15B illustrates the utility increasing scheduling algorithm, where the unassigned job queue is ordered from the highest utility to the lowest utility (block 544) and each job is assigned to the schedule to which it adds the greatest delta utility (block 546). FIG. 15C shows the utility decreasing scheduling algorithm. The unassigned job queue is ordered from the lowest utility to the highest utility to the highest (block 548). For each job schedule, it is assigned to the work schedule for which it adds the greatest delta utility (block 550).

Figure 6:
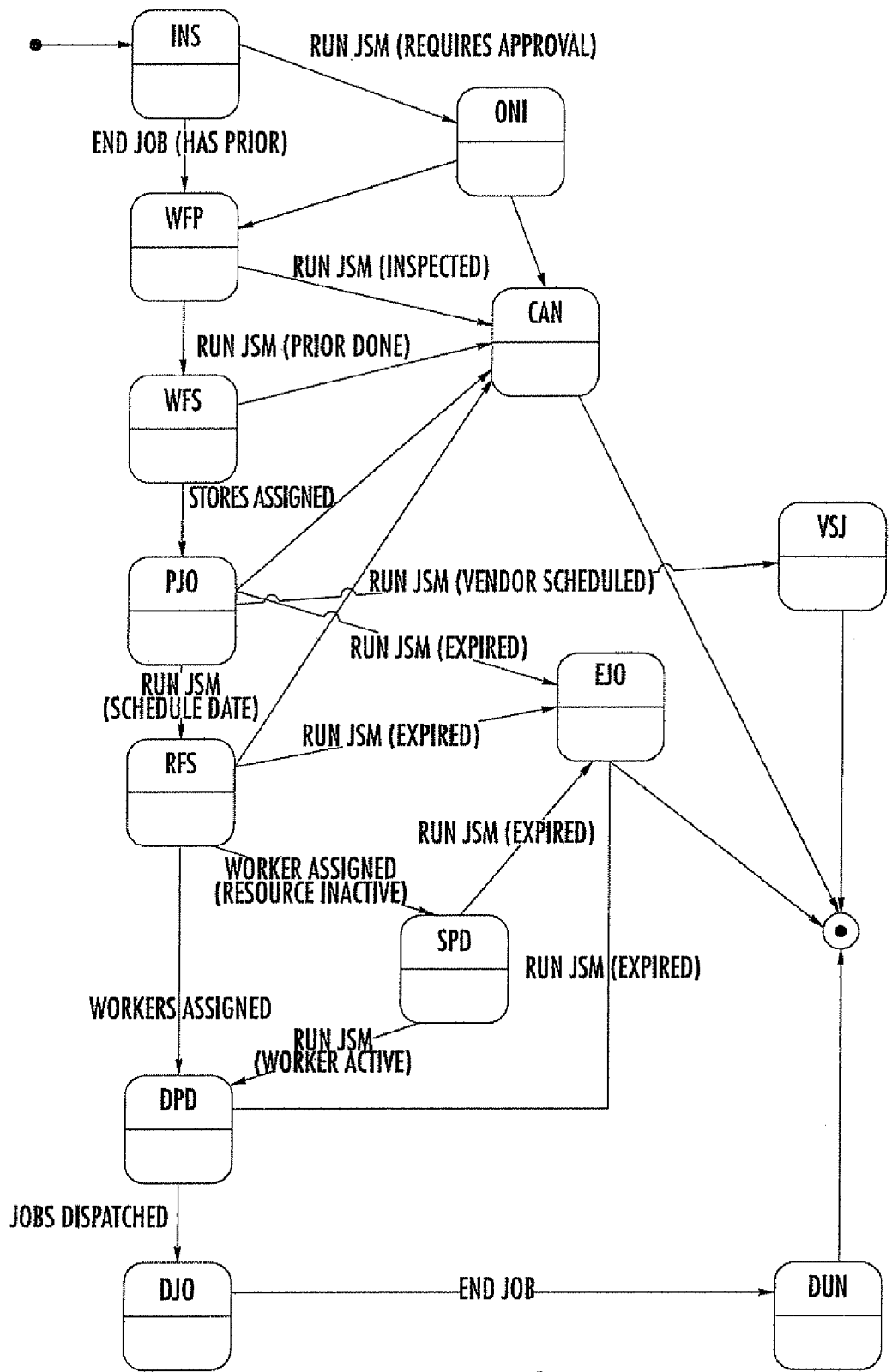
FIG. 6 is a flow chart illustrating an example of a job state transition used in accordance with the present invention.

FIG. 6 illustrates the interrelation between the live and historical databases. The live database holds the stored data and uses triggers and stored procedures to create a "create" record, which is recorded in a historical database. Updated records and deleted records are also stored in the historical database 562 as "update" records and "delete" records.

FIG. 17, as explained before, shows a general high level overview of the simulator program. Policy values are set in the simulator (block 570) and the simulator run (block 572). The information obtained is used to set policy values in the live system (block 574).

There now follows a general, high level description of the scheduling process.

For scheduling jobs, the attributes of the problem are used, such as location and skill, to partition the set of jobs and the workers. As a result, the system has several smaller problems to solve. Assumedly, each of the smaller problems is easier to solve than the original larger problem. An example of a partition would be one responsible for scheduling all the electric jobs on a location to the electricians at that location.

For each partition, the system uses a different algorithm to schedule the jobs in that partition to the workers in that partition. For example, the system can try an exhaustive try-all-combinations approach. This might be the best algorithm to use if, for example, there are 1 or 2 workers and perhaps a couple jobs, for example, the plumbers at a location. Other algorithms may prove to be more appropriate for partitions with more jobs and workers.

Partitioning is a process of taking a problem space and dividing it into "regions." In this case, the regions would be defined by the number of workers and the number of jobs for that region. An example might be all the electricians and all the electric jobs at one site. Partitioning results in the assignment of an algorithm and a set of "parameters" to each region. These algorithms are then used to schedule each partition. The result of this activity is a set of schedules for all the jobs and all the work schedules.

Part of this process is a classification problem. This is the assignment of algorithms and parameters to each partition. In support of this effort, experiments were run to determine how well various algorithms run under different parameterizations in different regions of the problem space. For example, for some of these algorithms, using different utility functions lead to different results. The utility function is thus one of the parameters that would be set for an algorithm, based on the characteristics of the problem space for that partition. The idea is to determine which parameter settings are useful in which regions for which algorithms.

The schedule agent treats each (location, skill) combination as a separate (partitioned) problem. It solves this problem using a set of algorithms and parameters that is tailored to the characteristics of that (location, skill) partition, such as the number of workers and the number of tasks for that location and skill.

The scheduler uses the a rule engine to determine the algorithms and parameters used for the particular characteristics of the location and skill partition. Inputs to the rule engine include characteristics of the partition, as well as system- and policy-level information. Outputs include the selection of algorithms and parameters (e.g., k-value) to be used for this location and skill.

The high level scheduling algorithm is thus as follows:

Given: A set of workers with their work schedules either empty or with jobs assigned. A set of jobs, some of which may have already been assigned to the above work schedules.

Produce: An assignment of jobs to work schedules such that all the hard constraints are satisfied for each work schedule. The soft constraints are optimized, based on the average goodness of fit of the schedules.

Algorithm:

1. Use the constraints on jobs being "admissible" for schedules to partition the problem space into regions.

2. Use the rule engine to determine the algorithm and parameters to be used to schedule work of each partition.

3. For each partition, use the rule engine designated algorithm to assign jobs to work schedules for that region.

4. Combine and persist results.

There now follows a general, high level example of utility calculation and examples of their use. Naturally, the following description has non-limiting examples that assist comprehension, but are no means limiting.

Each job adds a certain amount of "delta utility" or "marginal utility" to a workers schedule. This is just the overall utility of the work schedule minus the utility of the work schedule consisting of the same tasks minus the job in question. Note that, due to non-linearities in the utility computation (e.g., the effect of non-productive time) the marginal utility of a job will differ from worker to worker. Some of the scheduling algorithms take advantage of this fact during their operation: they tend to assign jobs to the work schedule for which they make the most positive marginal utility contribution.

The scheduling process for a (location, skill) may consist of the use of several algorithms, including a primary algorithm, an optimizing algorithm, and a trim algorithm. These are shown below:

Primary Pass: Attempted to assign each free task to a work schedule with replacement of lower utility tasks weighted sum with k=0.7 Penalizing: grade changes, NPT.

Trim Pass: Remove tasks of negative delta utility from work schedules. Weighted sum with k=0.4 Penalizing: grade changes, NPT.

Primary Pass attempt to assign each free task to a work schedule with replacement of lower utility tasks. This is a description of the algorithm used during the primary pass.

The primary pass is used to "fill up" the work schedules with a first approximation of the job assignments leading to maximal utility for these workers.

Weighted sum with k=0.7 Penalizing: grade changes, NPT. This is a description of the utility function used for this algorithm. The utility function in this case is a (weighted) sum of the time on schedule and the prioritized time on schedule. The "k" value is used to mix these two values into the "raw" utility. This raw utility is then modulated by the penalty factors; in this case, ones for grade changes (working under grade level) and non-productive time (NPT).

Optimizing Pass: Attempted to assign each free task to a work schedule with replacement of lower utility tasks. When included, the optimizing pass is an attempt to take high priority jobs on the unassigned job queue (UJQ) and assign them to workers. This sometimes includes displacing tasks that were assigned to the worker during the primary pass, as the assignment of jobs from the UJQ (with displacing, or replacing, tasks) raises the overall utility of the worker's schedule.

Trim Pass: Remove tasks of negative delta utility from work schedules. This is a description of the algorithm used during the trim pass. The trim pass is used to "touch up" work schedules, typically by removing jobs/tasks of negative or very small utility from worker's schedules.

In the present invention, a log file is produced by the system scheduling agent. Each log record contains a final summary near the very end. A typical log record as a non-limiting example that could be used in the present invention follows:

1) Summary Statistics: 8 workers, 24 tasks
2) Average Utility=26.1798%
3) System Parameters:
a) Workers may switch buildings
4) Factor Analysis:
5) Average factor due to usage over grade=0.981538
6) Average factor due to non-productive time=0.979904
7) Costing Analysis:
8) Total cost of Burdened labor=$628.2
9) Minimal labor costs=$624.2 (99.3633%)
10) Excess labor costs=$4 (0.63674%)
11) Excess labor costs due to usage over grade (2.5 hrs)=$4 (0.63674%)
12) Wasted labor costs=$412.2 (65.616%)
13) Wasted labor costs due to non-productive time (0.85 hrs)=$8.35 (1.32919%)
14) Wasted labor costs due to idle time (45.35 hrs)=$403.85 (64.2869%)
15) Nominal Labor cost per hour=$8.94872
16) Minimal Labor cost per productive hour=$8.83333
17) Labor cost per productive hour=$26.175

There now follows a description of this log on a line-by-line basis.

1) Summary Statistics: 8 workers, 24 tasks—This line describes the number of workers and tasks in the partition (one location for one skill).

2) Average Utility=26.1798%—This is the arithmetic mean (the average) of the utilities of the workers in the partition. Utility values range from 0% to 100%.

3) System Parameters—There are several policy level constants that effect the scheduling process.

3a) Workers may switch buildings—One of these is whether workers may incur NPT by having jobs in more than one building in the location.

4) Factor Analysis—The utility value is computed by multiplying the "raw" utility (measure of time and priority on work schedules) by a set of business-meaningful factors. Each factor consists of a multiplier between 0 and 1, which is further moderated by a policy-level constant, which measures the "importance" of the factor to the business. These constants are values between 0 and 1 that are used to attenuate the effect of the factor.

Factors contribute to excess labor (work that could be done by less expensive labor) and to wasted labor (time on a work schedule that could be used for productive work instead). These are both illustrated below.

5) Average factor due to usage over grade—This factor measures the excess labor penalty due to a worker being tasked for a job whose skill requirement is lower than that of the worker. A lower skill worker could do the same job, at lower overall cost to the business.

6) Average factor due to non-productive time—This factor measures the wasted labor penalty due to a worker incurring non-productive time, such as the time required to transport the worker between buildings if his work schedule includes jobs in more than one building at the location.

7) Costing Analysis—This section provides an analysis of the cost of labor and the minimal cost of labor for the jobs assigned to these workers.

The cost numbers below are the total for all workers that have been scheduled for the skill at the location. The costs per hour and per productive hour are the average for all workers that have been scheduled for the skill at the location.

8) Total cost of Burdened labor=$628.2—This is the total labor costs, based on the time on schedule for each worker and their corresponding labor rate.

9) Minimal labor costs—This is the total labor costs minus the costs for excess labor.

10) Excess labor costs—This is the cost for excess labor. In Version minus one, this is due to usage over grade.

11) Excess labor costs due to usage over grade—This is the cost of using the assigned worker for a task where a lower grade worker is acceptable, minus the cost of using that lower grade worker. It is an avoidable, excess cost due to non-ideal scheduling.

12) Wasted labor costs—This is the cost of idle and non-productive time.

13) Wasted labor costs due to non-productive time—This is the cost of labor for the hour(s) of non-productive time, such as the time it takes to transport the worker between buildings if he has jobs on his work schedule for more than one building at the location.

14) Wasted labor costs due to idle time—This is the cost of labor for the hour(s) the worker is not tasked.

15) Nominal Labor cost per hour—This is the cost of labor minus the cost of excess labor divided by the number of productive hours.

16) Minimal Labor cost per productive hour—This is the cost of the productive time on the worker's schedule (i.e., the labor without any non-productive time and using the minimal acceptable skilled worker for each job on the work schedule) divided by the amount of productive time.

17) Labor cost per productive hour—This is the cost of the hours on the work schedule (at the worker's nominal rate) divided by the amount of productive time.

There are several times in the log that the unassigned job/task queue (UJQ) may be shown. This includes at the beginning of the scheduling run, after each algorithm is applied, and after the final statistics. A typical display could include the following:

1 Unassigned Task: Task task12 pri=2 time=150 bldg=2 level=3

1 Unassigned Task: This is the total number of jobs/tasks on the UJQ at this time in the scheduling process.

Task task12 pri=2 time=150 bldg=2 level=3: This the task name, followed by the priority, time (in hundredth's of hours) and skill level required.

There are several times in the log that the worker schedule summary may be shown. This includes at the beginning of the scheduling run, after each algorithm is applied, and after the final statistics. A typical worker schedule summary log record could be as follows:

1) Assignments for Fred (time=870 bldg=1 skill=5)
2) utility=54.1696 W
3) Factor due to usage over grade=0.889231
4) Factor due to non-productive time=0.916923 (0.6 hours)
5) Costing Analysis:
6) Nominal cost per hour=$11
7) Cost per productive hour=$14.7231
8) Minimal cost per productive hour $10.3846
9) Total cost of Burdened labor=$95.7
10) Minimal cost of Labor (utility=1)=$67.5 (70.5329 W)
11) Excess labor costs=$4 (4.17973%)
12) Excess labor costs due to usage over grade (2.5 hrs)=$4 (4.17973%)
13) Wasted labor costs=$24.2 (25.2874%)
14) Wasted labor costs due to non-productive time (0.6 hrs)=$6.6 (6.89655%)
15) Wasted labor costs due to idle time (1.6 hrs)=$17.6 (18.3908%)

There now follows a detailed analysis for each line.

1) Assignments for Fred (time=870 bldg=1 skill=5)—This shows the number of jobs/tasks for this worker, the worker name, the time on the worker's schedule (in hundredths of hours), the building the worker is nominally in, and the worker's skill level.

2) Utility=54.1696%—This is a measure of the "goodness of the worker's schedule. It considers the time on schedule, the priority of jobs, the amount of non-productive and excess time on the schedule, and other factors that measure the schedule's economic value. Utility values range from 0% to 100%.

3) Factor due to usage over grade—This factor measures the excess labor penalty due to the worker being tasked for a job whose skill requirement is lower than that of the worker. A lower skill worker could do the same job, at lower overall cost to the business.

4) Factor due to non-productive time—This factor measures the wasted labor penalty due to the worker incurring non-productive time, such as the time required to transport the worker between buildings if his work schedule includes jobs in more than one building at the location.

5) Costing Analysis—This section provides an analysis of the cost of labor and the minimal cost of labor for the jobs assigned to the worker.

6) Nominal cost per hour—This is the cost of labor for the worker's schedule minus the cost of excess labor divided by the number of productive hours on the schedule.

7) Cost per productive hour—This is the cost of the hours on the work schedule (at the worker's nominal rate) divided by the amount of productive time.

8) Minimal cost per productive hour—This is the cost of the productive time on the worker's schedule (i.e., the labor without any non-productive time and using the minimal acceptable skilled worker for each job on the work schedule) divided by the amount of productive time.

9) Total cost of Burdened labor=$628.2—This is the total labor costs, based on the time on schedule for each worker and their corresponding labor rate.

10) Minimal cost of Labor (utility=1)—This is the total labor costs minus the costs for excess labor.

11) Excess labor costs—This is the cost for excess labor. In version minus one, this is due to usage over grade.

12) Excess labor costs due to usage over grade—This is the cost of using the assigned worker for a task where a lower grade worker is acceptable, minus the cost of using that lower grade worker. It is an avoidable, excess cost due to non-ideal scheduling.

13) Wasted labor costs—This is the cost of idle and non-productive time (NPT).

14) Wasted labor costs due to non-productive time—This is the cost of labor for the hour(s) of non-productive time, such as the time it takes to transport the worker between buildings if he has jobs on his work schedule for more than one building at the location.

15) Wasted labor costs due to idle time—This is the cost of labor for the hour(s) the worker is not tasked.

The individual work schedule detail tasking may be appended to the individual work schedule's summary information. The format is as follows:

Task task211 pri=3 time=50 bldg=1 level=4 Delta utility=0.0361758—This shows the job/task name, the priority value, the time required (in hundredths of hours), the building the task is in, the skill level required and the marginal utility for the job/task (see below)

The optimization process may optionally be shown "in action" as displayed below:

Beginning optimization pass with replacement of lower utility tasks
Starting next optimization pass over free task list
Work Schedule for Fred: adding task99983
removing task911
(0.0229544)
Work Schedule for Fred: adding task99993
removing task2142
(0.0398817)
Work Schedule for John: adding task99989
removing task812
(0.00637209)
Work Schedule for Marlene: adding task911
removing task1
removing task2
(0.046)
Starting next optimization pass over free task list
Optimization Pass Done
Optimizing Pass Attempted to assign each free task to a work schedule with replacement of lower utility tasks—weighted sum with k=0.8 Penalizing: grade changes, NPT
Trim Pass Remove tasks of negative delta utility from work schedules—weighted sum with k=0.5 Penalizing: grade changes, NPT The last two items are the display of the algorithms and utility functions used for the optimizing pass and the trim pass. These are the same displays described above. The rest of this section will describe the unique outputs from the optimization pass, typically run during the rescheduling process.

Beginning optimization pass with replacement of lower utility tasks—This is the delimiter for the beginning of the details of the optimization pass.

Optimization Pass Done—This is the delimiter for the end of the details of the optimization pass.

Starting next optimization pass over free task list—This is shown at the beginning of each sweep over the UJQ. Some of the algorithms used in the optimization pass continue to run until a sweep results in no changes to the work schedules and the UJQ.

Work Schedule for Fred: adding task99983—This shows a task being added onto a work schedule.

removing task911—This shows a task being removed as part of the action of adding the task shown above.

(0.0229544)—This shows the marginal utility of the actions: The utility of Fred's schedule is now 0.0229544 higher than it was before this swap of tasks.

Work Schedule for Fred: adding task99993 removing task2142 (0.0398817)

Work Schedule for John: adding task99989 removing task812

(0.00637209)

Two more examples of tasks being substituted on a work schedule.

Work Schedule for Marlene: adding task911 removing task1 removing task2

(0.046)

Here the task that was removed from Fred's schedule is added to Marlene's schedule, in place of two shorter tasks. This is known in the system of the present invention circles as the "hopscotch effect."

An example of the determination of grade factors and non-productive time follows. Consider a schedule with the following assignments to one worker:

---

Assignments for Fred (time = 870 bldg = 1 skill = 5)
utility = 0.206842
Factor due to usage over grade = 0.28
Factor due to non-productive time = 0.98875 (0.1 hours)
Costing Analysis:

Nominal cost per hour = $11
Cost per productive hour = $16.925
Total cost of Burdened labor = $135.4
Minimal cost of Labor (utility = 1) = $95.7 (70.6795%)
Excess labor costs = $39.7 (29.3205%)
Excess labor costs due to non-productive time(0.1 hrs) = $1.1 (0.812408%)
Excess labor costs due to idle time (0.6 hrs) = $6.6 (4.87445%)
Excess labor costs due to usage over grade (8 hrs) = $32 (23.6337%)
Task task2 pri = 3 time = 50 bldg = 1 level = 1 Delta utility = 0.012876
Task task1 pri = 3 time = 50 bldg = 1 level = 1 Delta utility = 0.012876
Task task42 pri = 4 time = 50 bldg = 1 level = 1 Delta utility = 0.0144659
Task task41 pri = 4 time = 50 bldg = 1 level = 1 Delta utility = 0.0144659
Task task12 pri = 2 time = 150 bldg = 2 level = 1 Delta utility = 0.0338683
Task task422 pri = 2 time = 150 bldg = 2 level = 1 Delta utility = 0.0338683
Task task412 pri = 3 time = 150 bldg = 2 level = 1 Delta utility = 0.038629
Task task22 pri = 5 time = 150 bldg = 2 level = 1 Delta utility = 0.0481505

---

NPT Factor: For this example, The NPT user-defined constant (multiplier) is 0.9. Note that Fred has 10 minutes of NPT: this is the distance between building 1 and building 2, according to the configuration file for that site. Therefore his NPT is derived as follows:

$$NPT = (pt - npt * \text{UserNPTFactor})/pt$$

Fred's schedule includes 8 hours (800 hundredths) productive time and 10 hundredths of npt and user defined constant Factor=0.9. Therefore:

$$NPT = (800 - (0.9*10))/900 = (800-9)/800 = 791/800 = 0.98875$$

Grade Factor The grade factor for this schedule is derived as follows: Fred's UserGradeFactor (multiplier) is 0.9 according to the configuration file. We first compute the rawgradefactor and then apply:

$$\text{Grade factor} = 1 - \text{UserGradeFactor}(1 - \text{rawGradeFactor}) \quad (**)$$

The raw grade factor is the sum of (the time on productive jobs X penalty)/time on productive jobs. The time on productive jobs can be seen is 8 hours (800 hundredths). The penalty is 1−(#grades over/maxGrades), where maxGrades is set to 5 in the configuration file. For the first task, time 50, penalty= (1−(4/5))=0.2 so time*penalty=10. Similarly, for the others the values are 10, 10, 10, 30, 30, 30, 30 for a total of 160, so the raw factor is 160/800 or 0.2.

We then apply the equation and compute the grade factor from (**) above:

$$\text{Grade factor} = 1 - (0.9*(1-0.20)) = 1 - (0.9*0.8) = 1 - 0.72 = 0.28$$

Thus the combined utility (the TRE scheduler rules determine that k=0.5 in this example) is:

$$0.28 * 0.9975 * \text{raw utility}$$

We now compute the raw utility. The raw utility is, for k=0.5, $$0.5A + (1-0.5)B$$

A is % time on schedule, or 800/870=0.91954.

B is % time*priority or $(50*3+50*3+50*4+50*4+150*2+150*2+150*3+150*5) = 2500/(870*5) = 2500/4350 = 0.57471$. Thus, $$0.5A + (1-0.5)B = 0.5(0.91954) + (1-0.5)$$
$$0.57471 = 0.45977 + 0.28736 = 0.7471$$

Therefore the final utility is:

$$0.28 * 0.98875 * 0.7471 = 0.20684$$

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

We claim:

1. A system for managing mobile workers, comprising:
a plurality of clients, each corresponding to a mobile worker to be managed, each client including a communications device for receiving messages detailing work schedules for tasks to be performed as jobs on target objects in a job environment;
a server in communication with each of said plurality of clients, said server including a database having a plurality of target objects that are classified corresponding to facilities assets to be worked on by a mobile worker, and attributes of each target object, including any tasks to be performed on target objects, said server including a rule engine operative for determining algorithms based on a utility function for partitioned jobs and mobile workers wherein different algorithms are selected and used for different partitions to schedule jobs and mobile workers in selected different regions, wherein an algorithm is selected based on a weighted sum that is calculated from a possible number of work schedules, jobs and mobile workers for each partition, wherein a selected policy for a job environment determines how mobile workers, jobs and work schedules are partitioned, said server further comprising a plurality of system agents that automate supervision including work planning, scheduling, dispatching, stores management job state management and end-of-shift management; and a communications device operative with said server for communicating calculated work schedules and jobs as messages to said clients.

2. The system according to claim 1, wherein said server further comprises a simulator database and simulation module that queries the simulator database to determine the effects of a policy change on planning and scheduling of jobs and workers using different algorithms and partitions.

3. The system according to claim 1, wherein said system agents further comprise a planner agent that inventories items requiring work and determines tasks to schedule, the skills required to complete the tasks and material needs.

4. The system according to claim 3, wherein said system agents further comprise a schedule agent that matches skill resources to the demands of the job and creates a proposed schedule.

5. The system according to claim 3, wherein said system agents further comprise a dispatcher agent for tracking the location and status of the workforce.

6. The system according to claim 3, wherein said system agents further comprise a job state manager that maintains the state of active jobs and determines which jobs transitions to new states.

7. The system according to claim 1, wherein said server further comprises an event bus operative with the system agents and database, wherein said system agents communicate across the event bus with the database and rule engine for implementing system agent functions based on events passed over the event bus.

8. The system according to claim 1, wherein said rule engine determines a primary scheduling algorithm and parameters to be used for scheduling jobs to workers.

9. The system according to claim 8, wherein said primary scheduling algorithm comprises a brute force scheduling algorithm that is operable by determining an n number of jobs and m workers, trying all combinations of n jobs on the schedules for m workers and choosing assignments that maximize the total utility of the worker's schedules.

10. The system according to claim 9, wherein the rule engine is operative for trying the brute force scheduling algorithm followed by a forward chaining rule engine or a round robin scheduling algorithm.

11. A system for managing mobile workers, comprising:
a plurality of clients, each corresponding to a mobile worker to be managed, each client including a communications device for receiving messages detailing work schedules for tasks to be performed as jobs on target objects in a job environment;
a server in communication with each of said plurality of clients, said server including a database having a plurality of target objects that are classified corresponding to facilities assets to be worked on by a mobile worker, and attributes of each target object, including any tasks to be performed on target objects, said server including a rule engine operative for determining algorithms based on a utility function for partitioned jobs and mobile workers wherein different algorithms are selected and used for different partitions to schedule jobs and mobile workers in selected different regions, wherein an algorithm is selected based on a weighted sum that is calculated from a possible number of work schedules, jobs and mobile workers for each partition, wherein a selected policy for a job environment determines how mobile workers, jobs and work schedules are partitioned, said server further comprising a plurality of system agents that automate supervision including work planning, scheduling, dispatching, stores management job state management and end-of-shift management, and a policy database for storing data relating to selected policy for a job environment and how the mobile workers, jobs and work schedules are partitioned; and a communications device operative with said server for communicating calculated work schedules and jobs to said clients.

12. The system according to claim 11, wherein said server further comprises a simulator database and simulator module that queries the simulator database to determine the effects of a policy change on planning and scheduling of jobs and workers using different algorithms and partitions.

13. The system according to claim 11, wherein said system agents further comprise a planner agent that inventories items requiring work and determines tasks to schedule, the skills required to complete the tasks and material needs.

14. The system according to claim 13, wherein said system agents further comprise a schedule agent that matches skill resources to the demands of the job and creates a proposed schedule.

15. The system according to claim 13, wherein said system agents further comprise a dispatcher agent for tracking the location and status of the workforce.

16. The system according to claim 13, wherein said system agents further comprise a job state manager that maintains the state of active jobs and determines which jobs transitions to new states.

17. The system according to claim 11, wherein said server further comprises an event bus operative with the system agents and database, wherein said system agents communicate across the event bus with the database and rule engine for implementing system agent functions based on events passed over the event bus.

18. The system according to claim 11, wherein said rule engine determines a primary scheduling algorithm and parameters to be used for scheduling jobs to workers.

19. The system according to claim 18, wherein said primary scheduling algorithm comprises a brute force scheduling algorithm that is operable by determining an n number of jobs and m workers, trying all combinations of n jobs on the schedules for m workers and choosing assignments that maximize the total utility of the worker's schedules.

20. The system according to claim 19, wherein the rule engine is operative for trying the brute force scheduling algorithm followed by a forward chaining rule engine or a round robin scheduling algorithm.

* * * * *